(12) United States Patent
Akah et al.

(10) Patent No.: US 12,742,125 B2
(45) **Date of Patent: *Sep. 22, 2026**

(54) DUAL REACTOR SYSTEM FOR SIMULTANEOUS DECONTAMINATION AND CRACKING OF PLASTIC DERIVED OIL TO CIRCULAR CHEMICALS

(71) Applicant: Saudi Arabian Oil Company, Dhahran (SA)

(72) Inventors: Aaron Chi Akah, Dhahran (SA); Rashed Aleisa, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 295 days.

This patent is subject to a terminal disclaimer.

(21) Appl. No.: 18/643,689

(22) Filed: Apr. 23, 2024

(65) Prior Publication Data

US 2025/0326975 A1 Oct. 23, 2025

(51) Int. Cl.
*C10G 55/06* (2006.01)
*B01D 3/14* (2006.01)
(Continued)

(52) U.S. Cl.
CPC ............. *C10G 55/06* (2013.01); *B01D 3/143* (2013.01); *B01D 15/08* (2013.01); *B01J 8/001* (2013.01);
(Continued)

(58) Field of Classification Search
CPC ............ C10G 55/06; C10G 2300/1003; C10G 2300/706; C10G 2400/20; C10G 11/04;
(Continued)

(56) References Cited

U.S. PATENT DOCUMENTS 6,346,220 B1 2/2002 Kosugi et al.
6,861,568 B1 3/2005 Guffey et al.
(Continued)

FOREIGN PATENT DOCUMENTS

CN 114106876 B 8/2023

OTHER PUBLICATIONS

Notification of Transmittal of the International Search Report and the Written Opinion of the International Searching Authority, or the Declaration dated Jul. 22, 2025 pertaining to International application No. PCT/US2025/023585 filed Apr. 8, 2025, pp. 1-16.

*Primary Examiner* — Ali Z Fadhel
(74) *Attorney, Agent, or Firm* — Dinsmore & Shohl LLP

(57) ABSTRACT

A process for upgrading plastic derived oil includes contacting the plastic derived oil with a mixed catalyst in a first reactor, where the mixed catalyst includes a decontamination catalyst and a cracking catalyst different from the decontamination catalyst. The first reactor reduces concentrations of halogen-containing compounds in the plastic derived oil. The process includes passing the first reactor effluent to a second reactor and contacting the first reactor effluent with the cracking catalyst to produce a second effluent comprising light olefins and naphtha range hydrocarbons. The process includes separating used mixed catalyst from the first reactor to produce a used decontamination catalyst and a second used cracking catalyst, and regenerating the decontamination catalyst and cracking catalyst in separate regenerators to reduce exposure of the cracking catalyst to halogen-containing compounds produced during regeneration of the used decontamination catalyst.

19 Claims, 5 Drawing Sheets

(51) Int. Cl.

| | |
|---|---|
| ***B01D 15/08*** | (2006.01) |
| ***B01J 8/00*** | (2006.01) |
| ***B01J 8/26*** | (2006.01) |
| ***B01J 23/889*** | (2006.01) |
| ***B01J 23/94*** | (2006.01) |
| ***B01J 35/31*** | (2024.01) |
| ***B01J 38/30*** | (2006.01) |

(52) U.S. Cl.
CPC ............. *B01J 8/26* (2013.01); *B01J 23/8892* (2013.01); *B01J 23/94* (2013.01); *B01J 35/31* (2024.01); *B01J 38/30* (2013.01); *B01J 2208/00548* (2013.01); *B01J 2208/00628* (2013.01); *C10G 2300/1003* (2013.01); *C10G 2300/1044* (2013.01); *C10G 2300/1048* (2013.01); *C10G 2300/706* (2013.01)

(58) Field of Classification Search
CPC ........................... C10G 25/03; C10G 2400/02; C10G 2400/30; C10G 1/002; C10G 11/182; C10G 11/187; C10G 1/10; B01D 15/08; B01J 8/1809; B01J 8/1827; B01J 8/26; B01J 23/8892; B01J 23/94; B01J 38/30; B01J 2208/00548; B01J 2208/00628; C10B 53/07
See application file for complete search history.

(56) References Cited

U.S. PATENT DOCUMENTS

| | | | | |
|---|---|---|---|---|
| 8,420,875 | B1 | 4/2013 | Mackay et al. | |
| 8,927,797 | B2 | 1/2015 | Sarker | |
| 9,404,046 | B2 | 8/2016 | Sarker | |
| 10,093,860 | B2 | 10/2018 | Griffiths | |
| 10,717,934 | B2 | 7/2020 | Griffiths | |
| 11,939,527 | B1 | 3/2024 | Timken et al. | |
| 2016/0264880 | A1 | 9/2016 | Narayanaswamy et al. | |
| 2021/0355389 | A1 | 11/2021 | Koseoglu | |
| 2022/0204870 | A1* | 6/2022 | Portela | C10G 51/06 |
| 2023/0203382 | A1 | 6/2023 | Brunetti et al. | |
| 2023/0257660 | A1 | 8/2023 | Akah | |

* cited by examiner 102
110
112
114
116
118
120
122
130
132
134
140
142
144
146
148
150
152
154
156
158
160
162
164
172
174
176
180
182
184
186
188
189

100
10
12
14
20
102
106
110
112
114
116
118
120
122
130
132
134
140
142
144
146
148
150
152
154
156
158
160
162
164
170
172
174
176
180
182
184
186
188
189
190
192
194
200
202
204
206
220
222
224
226
230
232

DUAL REACTOR SYSTEM FOR SIMULTANEOUS DECONTAMINATION AND CRACKING OF PLASTIC DERIVED OIL TO CIRCULAR CHEMICALS

BACKGROUND

Field

The present disclosure generally relates to systems and processes for upgrading plastic derived oils, more specifically, systems and processes for decontaminating and cracking plastic derived oils to greater value circular chemicals.

Technical Background

The use of plastics in commercial and industrial application has become prolific. The increasing use of plastics worldwide has increased the generation of waste plastic, which presents a sustainability opportunity. Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, some additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Development of processes for converting waste plastics into reusable materials, such as but not limited to chemical products, intermediates, or low carbon footprint fuels is continuing. Plastics pyrolyze at high temperatures and polymers can be converted back to their original monomers or smaller polymers as gas or liquid and can be recovered. Oils derived from plastics can contain compounds useful as fuel blending components or chemical feedstocks. However, the additives added to the plastic during production present challenges in effectively utilizing the recovered products from pyrolysis. Upon pyrolysis, the additives end-up in the pyrolysis products and thus require further processing to generate useful products. Additionally, the oils produced from pyrolysis of plastic waste can present a challenge due to the presence of halogenated organic compounds, such as those resulting from the presence of polyvinyl chloride (PVC) or other halogen-containing plastics. PVC is one of the most abundant plastics used for consumable goods. Waste plastic can contain from 1 weight percent (wt. %) to 5 wt. % PVC or other halogen-containing plastics. However, recycling of used PVC and other halogen-containing plastics is very difficult due to the presence of chlorine in the structure.

SUMMARY

Plastic derived oils have good properties and hydrocarbon constituents useful for application as fuel blending components or chemical feedstocks. However, plastic derived oils can present a processing challenge due to the presence of halogen-containing compounds (such as chlorine-containing hydrocarbon compounds) and due to the wide boiling point temperature range of the plastic derived oils, such as C5 to C25 or greater (boiling point temperatures of from 30° C. to 400° C. or even greater than 400° C.). Plastic derived oils can also include compounds with different functional groups and families of organic compounds such as but not limited to oxygenates, aromatic compounds, olefins, alkanes, other hydrocarbon compounds, or combinations of these. The direct use of plastic waste derived oil in catalytic cracking to produce circular chemicals can lead to problems downstream because of the presence of halogenated compounds, such as but not limited to chlorine-containing hydrocarbon compounds.

Accordingly, an ongoing need exists for systems and processes for decontaminating plastic derived oils and converting the plastic derived oils into greater value chemical products and intermediates, such as but not limited to light olefins (C2-C4 olefins), light aromatic compounds (C6-C8 aromatic compounds), low carbon footprint fuel components, other circular chemicals, or combinations of these. The present disclosure satisfies these needs by presenting systems and processes for removing halogen-containing compounds and other contaminants from the plastic derived oils and then converting the plastic derived oils to greater value chemical products and intermediates. In particular, the systems and methods disclosed herein include a dual reactor system for decontaminating and converting plastic derived oils to produce the greater value circular chemical products and intermediates, which can include but are not limited to light olefins, light aromatic compounds, low carbon footprint fuel blending components, other circular chemicals, or combinations of these.

The dual reactor system includes a first reactor for decontamination of the plastic derived oil and a second reactor for catalytic cracking the first reactor effluent to produce the greater value circular chemical products and intermediates. The first reactor removes halogen-containing compounds from the plastic derived oil by contacting the plastic derived oil with a mixed catalyst comprising a mixture of a decontamination catalyst and a cracking catalyst. The decontamination catalyst converts halogen-containing compounds to hydrogen halides and organic compounds and then adsorbs the hydrogen halides onto the surface of the decontamination catalyst. The cracking catalyst in the first reactor increases removal of the halogen-containing compounds by cracking larger molecules in the plastic derived oil to improve access to halogen-containing areas of molecules by the decontamination catalyst. The dual reactor system includes separate catalyst regenerators for the decontamination catalyst in the first reactor and for the cracking catalyst in the second reactor. The separate catalyst regenerators may reduce and limit exposure of the cracking catalyst to hydrogen halides produced during regeneration of the decontamination catalyst, thereby reducing damage to the cracking catalyst. The two separate regenerators may also allow for tailored regeneration conditions for each of the two types of catalysts.

According to one or more aspects of the present disclosure, a system for upgrading plastic derived oil may comprise a first reactor containing a mixed catalyst comprising a mixture of a decontamination catalyst and a cracking catalyst that is different from the decontamination catalyst. The first reactor may be a fluidized bed reactor and may be configured to contact a plastic derived oil stream with the mixed catalyst to produce a first reactor effluent. The system may further include a first fluid-solid separation unit disposed at an outlet end of the first reactor, where the first fluid-solid separation unit may be configured to separate the first reactor effluent from a used mixed catalyst. The system may further comprise a second reactor containing the cracking catalyst. The second reactor may be a fluidized bed reactor and may be configured to contact at least a portion of the first reactor effluent with the cracking catalyst to produce a second reactor effluent. The system may further include a second fluid-solid separation unit disposed at an outlet end of the second reactor, where the second fluid-solid separation unit may be configured to separate the second reactor effluent from a first used cracking catalyst. The system may comprise a catalyst separator disposed downstream of the first fluid-solid separation unit and configured to separate the used mixed catalyst to produce a used decontamination catalyst and a second used cracking catalyst. The system may comprise a decontamination catalyst regenerator disposed downstream of the catalyst separator, where the decontamination catalyst regenerator may be configured to regenerate the used decontamination catalyst to produce regenerated decontamination catalyst. The system may further comprise a cracking catalyst regenerator disposed downstream of the second fluid-solid separation unit, where the cracking catalyst regenerator may be configured to regenerate the first used cracking catalyst and the second used cracking catalyst to produce regenerated cracking catalyst.

According to another aspect of the present disclosure, a process for upgrading plastic derived oil may comprise contacting a plastic derived oil stream with a mixed catalyst in a first reactor. The first reactor may be a fluidized bed reactor, and the mixed catalyst may comprise a mixture of a decontamination catalyst and a cracking catalyst different from the decontamination catalyst. The contacting the plastic derived oil stream with the mixed catalyst at reaction conditions may produce a first reactor effluent having reduced concentrations of halogen-containing compounds compared to the plastic derived oil stream. The process may further comprise separating the first reactor effluent from the used mixed catalyst, passing at least a portion of the first reactor effluent to a second reactor disposed downstream of the first reactor, and contacting the at least a portion of the first reactor effluent with the cracking catalyst at cracking reaction conditions in the second reactor. The contacting the at least a portion of the first reactor effluent with the cracking catalyst at the reaction conditions in the second reactor may catalytically crack the portion of the first reactor effluent to produce a second reactor effluent comprising light olefins, naphtha range hydrocarbons, or combinations thereof. The process may further comprise separating the second reactor effluent from the used cracking catalyst to produce a first used cracking catalyst, separating the used mixed catalyst to produce a used decontamination catalyst and a second used cracking catalyst, regenerating the used decontamination catalyst in a decontamination catalyst regenerator to produce a regenerated decontamination catalyst, and regenerating the first used cracking catalyst and the second used cracking catalyst in a cracking catalyst regenerator separate from the decontamination catalyst regenerator, where regenerating the first used cracking catalyst and second used cracking catalyst in the cracking catalyst regenerator may reduce exposure of the cracking catalyst to halogen-containing compounds produced during regeneration of the used decontamination catalyst.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
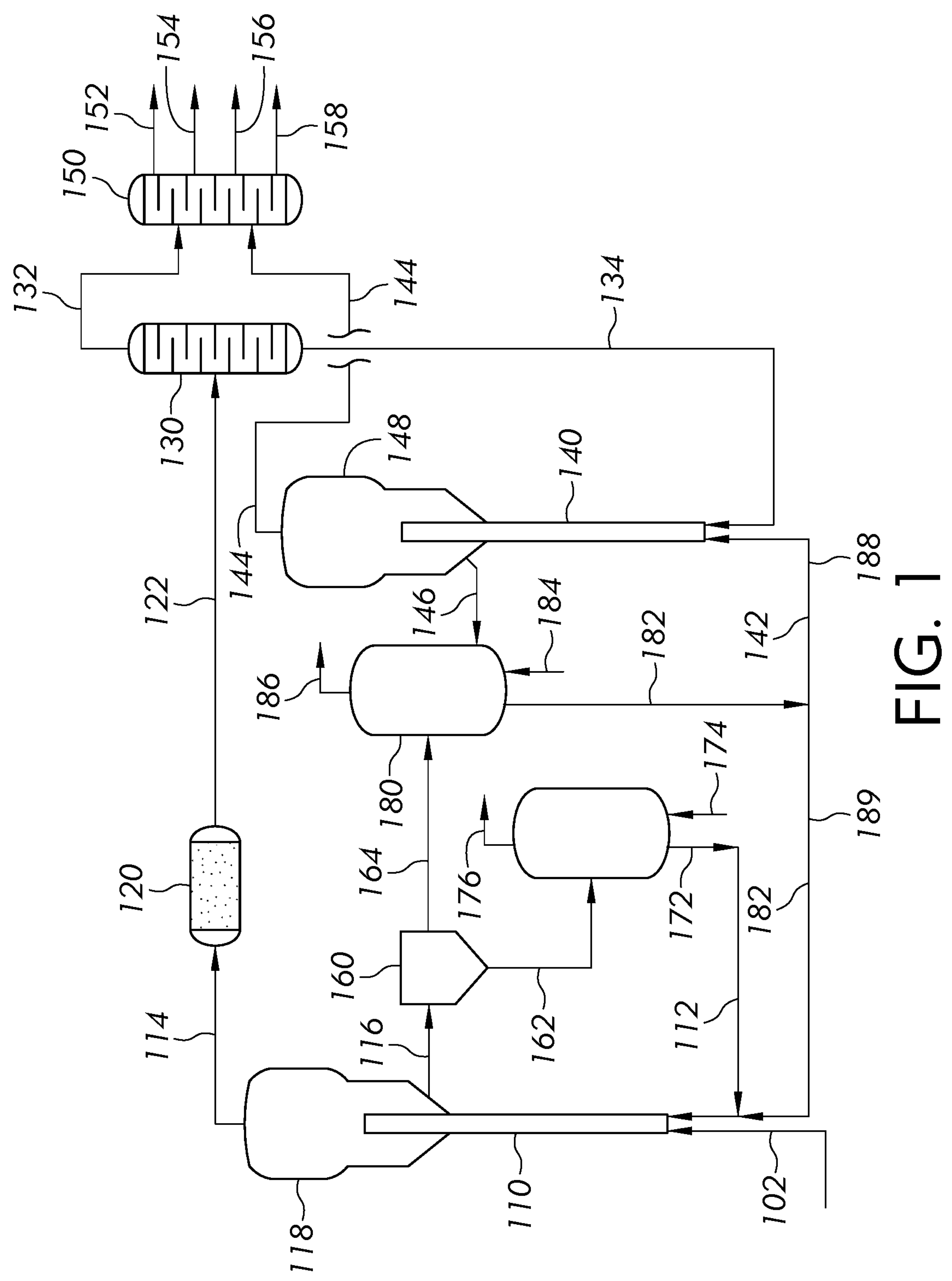
FIG. 1 schematically depicts a generalized flow diagram of a system for upgrading plastic derived oils, according to embodiments shown and described in this disclosure.

For the purpose of describing the simplified schematic illustrations and descriptions of FIGS. 1-4 some of the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-4. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to systems and processes for processing plastic derived oils, such as decontaminating and converting plastic derived oils to produce greater value chemical products and intermediates. Referring now to FIG. 1, one embodiment of a system 100 of the present disclosure for processing the plastic derived oils 102 is schematically depicted. The system 100 may comprise a first reactor 110 containing a mixed catalyst comprising a mixture of a decontamination catalyst 112 and a cracking catalyst 142 that is different from the decontamination catalyst 112. The first reactor 110 is a fluidized bed reactor and is configured to contact a plastic derived oil stream 102 with the mixed catalyst to produce a first reactor effluent 114. The system 100 may further include a first fluid-solid separation unit 118 disposed at an outlet end of the first reactor 110. The first fluid-solid separation unit 118 may be configured to separate the first reactor effluent 114 from a used mixed catalyst 116. The system 100 may include a second reactor 140 containing the cracking catalyst 142, where the second reactor 140 is a fluidized bed reactor and is configured to contact at least a portion of the first reactor effluent 114 with the cracking catalyst 142 to produce a second reactor effluent 144. The system 100 may include a second fluid-solid separation unit 148 disposed at an outlet end of the second reactor 140, and the second fluid-solid separation unit 148 may be configured to separate the second reactor effluent 144 from a first used cracking catalyst 146. The system 100 may include a catalyst separator 160 disposed downstream of the first fluid-solid separation unit 118 and configured to separate the used mixed catalyst 116 to produce a used decontamination catalyst 162 and a second used cracking catalyst 164. The system 100 may include a decontamination catalyst regenerator 170 disposed downstream of the catalyst separator 160 and configured to regenerate the used decontamination catalyst 162 to produce regenerated decontamination catalyst 172. The system 100 may further include a cracking catalyst regenerator 180 disposed downstream of the second fluid-solid separation unit 148 and configured to regenerate the first used cracking catalyst 146 and the second used cracking catalyst 164 to produce regenerated cracking catalyst 182.

Additionally, processes for upgrading plastic derived oil are disclosed. The processes may include contacting the plastic derived oil stream 102 with the mixed catalyst in the first reactor 110. The first reactor 110 may be a fluidized bed reactor, the mixed catalyst may comprise a mixture of the decontamination catalyst 112 and the cracking catalyst 142 different from the decontamination catalyst 112, and the contacting the plastic derived oil stream 102 with the mixed catalyst at reaction conditions may produce a first reactor effluent 114 having reduced concentrations of halogen-containing compounds compared to the plastic derived oil stream 102. The processes may include separating the first reactor effluent 114 from the used mixed catalyst 116, passing at least a portion of the first reactor effluent 114 to a second reactor 140 disposed downstream of the first reactor 110, and contacting the portion of the first reactor effluent 114 with the cracking catalyst 142 at cracking reaction conditions in the second reactor 140. Contacting the portion of the first reactor effluent 114 with the cracking catalyst 142 at the reaction conditions in the second reactor 140 catalytically cracks the portion of the first reactor effluent 114 to produce a second reactor effluent 144 comprising light olefins, naphtha range hydrocarbons, or combinations thereof. The processes may further include separating the second reactor effluent 144 from the used cracking catalyst to produce a first used cracking catalyst 146, separating the used mixed catalyst 116 to produce a used decontamination catalyst 162 and a second used cracking catalyst 164, regenerating the used decontamination catalyst 162 in a decontamination catalyst regenerator 170 to produce a regenerated decontamination catalyst 172, and regenerating the first used cracking catalyst 146 and the second used cracking catalyst 164 in a cracking catalyst regenerator 180 separate from the decontamination catalyst regenerator 170. Regenerating the first used cracking catalyst 146 and second used cracking catalyst 164 in the cracking catalyst regenerator 180 may reduce exposure of the cracking catalyst to halogen-containing compounds produced during regeneration of the used decontamination catalyst 162.

As used in this disclosure, the term "catalyst" refers to any substance that increases the rate of a specific chemical reaction. Catalysts and catalyst components described in this disclosure can be utilized to promote various reactions, such as, but not limited to selective hydrogenation, ring opening, disproportionation, dealkylation, hydrodealkylation, transalkylation, cracking, aromatic cracking, dehalogenation, other chemical reactions, or combinations of these.

As used in this disclosure, the term "used catalyst" refers to catalyst that has been contacted with reactants but has not been regenerated to restore at least a portion of the catalytic activity. The term "regenerated catalyst" refers to a catalyst that has been regenerated in a regenerator or through a regeneration process to increase the catalytic activity, the temperature, or both of the regenerated catalyst.

As used in this disclosure, the term "aromatic compounds" refers to compounds having one or more aromatic ring structures. The term "light aromatic compounds" refers to compounds having an aromatic ring, with or without substitution, and from six to eight carbon atoms. The term "BTEX" refers to any combination of one or a plurality of benzene, toluene, ethylbenzene, para-xylene, meta-xylene, and ortho-xylene.

As used in this disclosure, the term "xylenes," when used without a designation of the isomer, such as the prefix para, meta, or ortho, refers to one or more of meta-xylene, ortho-xylene, para-xylene, and mixtures of these xylene isomers.

As used in this disclosure, the terms "butenes" and "mixed butenes" refers to 1-butene, cis-2-butene, trans-2-butene, isobutene, and combinations of these. As used in this disclosure, the term "normal butenes" refers to 1-butene, cis-2-butene, trans-2-butene, and any combination thereof, but not including isobutene.

As used in this disclosure, the terms "low carbon footprint fuels" or "low carbon footprint fuel components" refers to fuels and/or fuel components derived from non-fossil origin in contrast to conventional fuels which are produced from petroleum extracted from subterranean sources. The "low carbon footprint fuels" or "low carbon footprint fuel components" are produced sustainably from municipal or organic waste, sustainable biomass, renewables, and circular $CO_2$. Production and use of the low carbon footprint fuels and fuel components result in very little or no additional $CO_2$ generated. Low carbon footprint fuels and fuel components can help to reduce greenhouse emissions and mitigate the effects of climate change.

As used in this disclosure, the term "circular chemicals" refers to chemicals that are derived from the process of recycling waste materials back to produce useful chemical products and intermediates.

As used in this disclosure, the terms "boiling point temperature," or "boiling temperature," or "boiling point" refer to the temperature at which a compound or composition boils at atmospheric pressure, unless otherwise stated.

As used in this disclosure, the term "initial boiling point" or "IBP" of a composition refers to the temperature at which the constituents of the composition having the lowest boiling point temperature begin to transition from the liquid phase to the vapor phase.

As used in this disclosure, the term "final boiling point" or "FBP" of a composition refers to the temperature at which the greatest boiling temperature constituents of the composition transition from the liquid phase to the vapor phase.

As used in this disclosure, the term "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, cryogenic distillation units, fractionators, flash drums, knock-out drums, knock-out pots, centrifuges, filtration devices, traps, scrubbers, expansion devices, membranes, solvent extraction devices, pressure swing adsorption units, high-pressure separators, low-pressure separators, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the terms "upstream" and "downstream" refer to the relative positioning of unit operations with respect to the direction of flow of the process streams through the system. A first unit operation of a system is considered "upstream" of a second unit operation if process streams flowing through the system encounter the first unit operation before encountering the second unit operation. Likewise, a second unit operation is considered "downstream" of the first unit operation if the process streams flowing through the system encounter the first unit operation before encountering the second unit operation.

As used in this disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent, unless otherwise specifically stated in the present disclosure. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, the term "effluent" refers to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The terms "reaction effluent" or "reactor effluent" are more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream, notwithstanding any inert gases or diluents added to the stream). It should also be understood that components of a stream are disclosed as passing from one system component to another when a stream comprising that component is disclosed as passing from that system component to another. For example, a disclosed "olefin stream" passing to a first system component or from a first system component to a second system component should be understood to equivalently disclose the "olefin compounds" passing to the first system component or passing from a first system component to a second system component.

The demand for circular chemicals, which can be used for the production of chemical intermediates used in production of polymers and plastics as well as for fuel components, is steadily increasing. Circular chemicals can include monomers such as ethylene, propylene, butenes, benzene, xylenes, and toluene that are produced from plastic waste and plastic derived oil. These monomers can be then be used again for the production of polymers such as polyethylene, polypropylene and polyethylene terephthalate. They are called circular chemicals because they are derived from the process of recycling waste materials back to produce useful chemical products and intermediates. Converting plastic waste can also produce low carbon footprint fuel components, which can provide additional sources of fuel with reduced $CO_2$ generation, compared to fuel components derived from fossil fuels extracted from subterranean sources.

As previously discussed, plastic derived oils have good properties and contain hydrocarbon constituents useful for application as chemical intermediates and fuel blending components. However, plastic derived oils can include halogen-containing compounds, such as but not limited to chloro-organic compounds, and other contaminants resulting from the types of solid waste plastic and additives included in the plastics, and the plastic derived oils can have a broad boiling point temperature range, such as from 30° C. to 400° C., or even greater than 400° C. Plastic derived oils can also include compounds with different functional groups and families of organic compounds, such as but not limited to oxygenates, aromatic compounds, olefins, alkanes, other hydrocarbon compounds, or combinations of these.

The direct use of plastic waste derived oils in catalytic cracking to produce chemical products, intermediates, or fuel components can lead to problems downstream because of the presence of the halogen-containing compounds. These problems can include corrosion caused by the breakdown of organic halides, such as organic chlorides, to form HCl, which is corrosive and can attack refinery equipment such as pipes, valves and heat exchangers, leading to leaks, equipment failure, and costly repairs. The presence of organic halides can also poison or damage catalysts, such as cracking catalysts, used in refining processes, which can reduce the efficiency of the refining process, leading to lower quality products and process inefficiencies. In particular, HCl, which can be formed by breakdown of organic halides, can cause dealumination of cracking catalysts, such as zeolites, which can change the acidity and reactivity of the cracking catalysts for catalyzing cracking reactions. Organic halides can form salts, such as but not limited to ammonium chloride ($NH_4Cl$), that can foul refinery equipment, such as pipes or heat exchangers. Organic halides can also contaminate refined products such as gasoline and diesel fuels, resulting in product quality problems such as but not limited to engine knocking and fuel injector fouling. Further, organic chlorides can be released into the environment through waste water and air emissions, which can have a negative impact on human health and the environment.

The systems and processes of the present disclosure solve these problems associated with recycling of plastic waste into greater value chemical intermediates and fuel components. The systems and processes of the present disclosure are directed to decontamination and conversion of plastic derived oils to greater value chemical products and intermediates and fuel blending components. In particular, the systems and processes of the present disclosure include a dual reactor system in which the plastic derived oils are decontaminated in a first reactor using a decontamination catalyst to remove halogen-containing compounds and other contaminants, and at least a portion of the first reactor effluent is then catalytically cracked with a cracking catalyst in a second reactor to produce a second reactor effluent containing one or more greater value products and intermediates, such as but not limited to light olefins, light aromatic compounds, naphtha range hydrocarbons, low carbon footprint fuel components, or combinations of these.

The first reactor and the second reactor may both be fluidized bed reactors using different types of catalysts, and the system may include a decontamination catalyst regenerator and a cracking catalyst regenerator, which is separate from the decontamination catalyst regenerator. The two separate catalyst regenerators allow for regeneration of the cracking catalyst to be maintained completely separate from regeneration of the decontamination catalyst and from the hydrogen halides and other halogen containing compounds that may be produced in the decontamination catalyst regenerator during regeneration of the decontamination catalyst. This may reduce or prevent degradation of the cracking catalyst, such as dealumination, which can change the reactivity of the cracking catalyst. The two separate catalyst regenerators may also enable the regeneration conditions to be tailored to each of the separate catalyst (decontamination catalyst and cracking catalyst).

Contact of the plastic derived oil with the decontamination catalyst in the first reactor may remove only part of the halogen-containing compounds from the plastic derived oil through conversion of the halogen-containing compounds to hydrogen halides followed by adsorption of the hydrogen halides onto the decontamination catalyst. A substantial amount of the halogen-containing compounds in the plastic derived oil, however, remain inaccessible to the decontamination catalysts in the first reactor due to being embedded within large molecules, such as waxes or other heavy components, or agglomerates of large molecules entangled together. The decontamination catalysts effective at removing halogen-containing compounds do not possess the ability to efficiently crack the heavy constituents of the plastic derived oil, particularly at the reaction temperatures of the first reactor of from 300° C. to 450° C. As a result, the first reactor effluent produced by the first reactor may still include a higher than desired concentration of halogen-containing compounds.

In the systems and processes of the present disclosure, the first reactor uses a mixed catalyst comprising a mixture of the decontamination catalyst and the cracking catalyst. The cracking catalyst can be the same as used in the second reactor. The addition of the cracking catalyst in the mixed catalyst used in the first reactor may help to convert larger molecules into smaller molecules, such as light oils and gases, which may improve access of the decontamination catalyst to more of the halogen-containing compounds. The cracking catalyst may also help to activate more difficult to activate halogenated compounds, such halogenated aromatic compounds. Thus, the combination of the cracking catalyst and the decontamination catalyst may increase the amount of halogen-containing compounds removed from the plastic derived oil in the first reactor compared to using the decontamination catalyst by itself.

The combination of the decontamination followed by catalytic cracking produces circular chemicals, which are chemicals that are recovered from waste and reused to make additional products. The systems and processes of the present disclosure, which include decontamination and catalytic cracking, may enable the recycling of a broader range of types of solid waste plastic while reducing downstream problems caused by chlorine-containing compounds or other contaminants. In particular, the first reactor effluent coming from the first reactor substantially reduces the level of contaminants especially halogens to the levels that meet refinery specification. This makes the first reactor effluent suitable for further conversion to circular chemicals and fuels. The reaction parameters and the cracking catalyst in the second reactor can, thus, be adjusted to maximize the yield of circular chemicals, low carbon footprint fuel components, or both. Low carbon footprint fuels and fuel components can help to reduce greenhouse emissions and mitigate the effects of climate change. The systems and processes of the present disclosure can be easily integrated into existing petroleum refineries and petrochemical installations.

Referring now to FIG. 1, one embodiment of a system 100 for upgrading a plastic derived oil stream is schematically depicted. The system 100 may include a plastic derived oil stream 102, a first reactor 110, a second reactor 140 disposed downstream of the first reactor 110, and a product separation system 150 disposed downstream of the second reactor 140. The system 100 may also include an adsorption unit 120 disposed downstream of the first reactor 110 and a first reactor effluent separation system 130 disposed between the adsorption unit 120 and the second reactor 140. The adsorption unit 120 may comprise an absorbent and may be configured to contact the first reactor effluent 114 with the adsorbent to produce a treated first reactor effluent 122. The product separation system 150 may be configured to separate the second reactor effluent 144 to produce a plurality of product streams, such as but not limited to an ethylene stream, a propylene stream, a mixed butenes stream, a light aromatics stream, a naphtha stream, a gasoline stream, a heavy stream, or combinations of these.

The first reactor 110 may include a mixed catalyst comprising a mixture of the decontamination catalyst 112 and the cracking catalyst 142. The first reactor 110 may be a fluidized bed reactor configured to contact the plastic derived oil stream 102 with the mixed catalyst at reaction conditions sufficient to remove halogen-containing compounds and other contaminants from the plastic derived oil stream 102 to produce a first reactor effluent 114. The system 100 may comprise a first fluid-solid separation unit 118 disposed at an outlet end of the first reactor 110. The first fluid-solid separation unit 118 may be configured to separate the first reactor effluent 114 from the used mixed catalyst 116.

The second reactor 140 may include the cracking catalyst 142. The second reactor 140 may be a fluidized bed reactor configured to contact at least a portion of the treated first reactor effluent 122 with the cracking catalyst 142 at reaction conditions sufficient to cause hydrocarbons in the at least a portion of the treated first reaction effluent 122 to undergo catalytic cracking to produce a second reactor effluent 144. The system 100 may include a second fluid-solid separation unit 148 disposed at an outlet of the second reactor 140. The second fluid-solid separation unit 148 may be configured to separate the second reactor effluent 144 from a first used cracking catalyst 146.

Referring again to FIG. 1, the system 100 may further include a catalyst separator 160 downstream of the first fluid-solid separation unit 118, a decontamination catalyst regenerator 170 disposed downstream of the catalyst separator 160, and a cracking catalyst regenerator 170 separate from the decontamination catalyst regenerator 170. The catalyst separator 160 may separate the used mixed catalyst 116 into a used decontamination catalyst 162 and a second used cracking catalyst 164. The decontamination catalyst regenerator 170 may be configured to regenerate the used decontamination catalyst 162 to produce a regenerated decontamination catalyst 172, which may be passed back to the first reactor 110 as at least a portion of the decontamination catalyst 112 in the mixed catalyst. The system 100 may also include a cracking catalyst regenerator 180 disposed downstream of the second fluid-solid separation unit 148. The cracking catalyst regenerator 180 is separate from the decontamination catalyst regenerator 170 and is configured to regenerate the first used cracking catalyst 146 and the second used cracking catalyst 164 to produce a regenerated cracking catalyst 182, which may be passed back to the second reactor 140 as the cracking catalyst 142. A portion of the regenerated cracking catalyst 182 may also be passed to the first reactor 110 as the cracking catalyst portion of the mixed catalyst.

The separate decontamination catalyst regenerator 170 and cracking catalyst regenerator 180 may ensure that the decontamination catalyst and cracking catalyst are maintained separate from one another during regeneration. This may enable proper handling of halogen compounds, such as but not limited to chlorine gas ($Cl_2$), HCl, or other halogen compounds released during regeneration of the used decontamination catalyst 162. The separate regenerators may also reduce degradation of the catalytic activity of the cracking catalyst caused by contact of the cracking catalyst with halogen compounds, such as but not limited to $Cl_2$ or HCl, produced during regeneration of the used decontamination catalyst 162. Contact with $Cl_2$, HCl, or other halogen compounds in the presence of water vapor (which may also be produced during regeneration of the decontamination catalyst), can cause dealumination of the cracking catalyst, leading to reduction in the catalytic activity of the cracking catalysts for catalyzing cracking reactions. The separate regenerators may also enable regeneration conditions to be tailored to each of the used decontamination catalyst 1162 and used cracking catalyst (first used cracking catalyst 146 and second used cracking catalyst 164), which can enhance effectiveness of the regeneration for each of the two types of catalysts.

The plastic derived oil stream 102 may be a liquid stream comprising hydrocarbons and produced through melting, dehalogenation, and pyrolysis of solid waste plastics. As previously discussed, the plastic derived oil stream 102 may include hydrocarbons, such as but not limited to aromatic compounds, olefins, alkanes, other hydrocarbon compounds. Additionally, the plastic derived oil stream 102 may include other organic compounds, such as but not limited to oxygenates, organic halide compounds, plastic additives, and other contaminants. The plastic derived oil stream 102 may comprise a concentration of organic halide compounds of from 10 part per million by weight (ppmw) to 500 ppmw. In embodiments, the plastic derived oil stream 102 may comprise a concentration of organic halide compounds of from 10 ppmw to 400 ppmw, from 10 ppmw to 300 ppmw, from 50 ppmw to 500 ppmw, from 50 ppmw to 400 ppmw, from 50 ppmw to 300 ppmw, from 100 ppmw to 500 ppmw, from 100 ppm to 400 ppmw, from 100 ppmw to 300 ppmw, from 150 ppmw to 500 ppmw, from 150 ppmw to 400 ppmw, or from 150 ppmw to 300 ppmw.

In embodiments, the plastic derived oil stream 102 may comprise naphtha range hydrocarbons, middle distillates, heavy compounds, or combinations of these. Naphtha range hydrocarbons refer to hydrocarbons having atmospheric boiling point temperatures of from 25° C. to 221° C., middle distillates include hydrocarbons having atmospheric boiling point temperatures of from 221° C. to 343° C., and the heavy compounds refer to hydrocarbons having atmospheric boiling point temperatures of greater than 343° C. In embodiments, the plastic derived oil stream 102 may comprise from 20 wt. % to 45 wt. % naphtha range hydrocarbons, such as from 20 wt. % to 40 wt. %, from 20 wt. % to 35 wt. %, from 20 wt. % to 30 wt. %, from 30 wt. % to 45 wt. %, from 30 wt. % to 40 wt. %, from 35 wt. % to 45 wt. %, from 35 wt. % to 40 wt. %, or about 38 wt. % naphtha range hydrocarbons based on the total weight of the plastic derived oil stream 102. In embodiments, the plastic derived oil stream 102 may comprise from 40 wt. % to 70 wt. % middle distillates, such as from 40 wt. % to 60 wt. %, from 40 wt. % to 55 wt. %, from 40 wt. % to 50 wt. %, from 45 wt. % to 70 wt. %, from 45 wt. % to 60 wt. %, from 45 wt. % to 55 wt. %, from 45 wt. % to 50 wt. %, or about 48 wt. % middle distillates based on the total weight of the plastic derived oil stream 102. In embodiments, the plastic derived oil stream 102 may comprise from 5 wt. % to 25 wt. % heavy distillates, such as from 5 wt. % to 20 wt. %, from 5 wt. % to 15 wt. %, from 10 wt. % to 25 wt. %, from 10 wt. % to 20 wt. %, from 10 wt. % to 15 wt. %, or about 14 wt. % heavy distillates based on the total weight of the plastic derived oil stream 102.

The plastic derived oil 102 may be characterized by a boiling point distribution determined using standard test method ASTM D2887. In embodiments, the plastic derived oil 102 may have an initial boiling point (IBP) of from 20° C. to 100° C., such as from 20° C. to 60° C., from 20° C. to 50° C., from 25° C. to 100° C. from 25° C. to 60° C., from 25° C. to 50° C., or from 25° C. to 40° C. In embodiments, the plastic derived oil 102 may have a final boiling point (FBP) of from 300° C. to 600° C., such as from 300° C. to 500° C., from 300° C. to 450° C., from 350 to 600° C., from 350° C. to 500° C., from 350° C. to 450° C., or from 375° C. to 425° C. In embodiments, the plastic derived oil 102 may have a 50% boiling point temperature of from 150° C. to 350° C., such as from 150° C. to 300° C., from 150° C. to 275° C., from 200° C. to 350° C., from 200° C. to 300° C., from 200° C. to 275° C., from 225° C. to 350° C., from 225° C. to 300° C., or from 225° C. to 275° C., where the 50% boiling point temperature is the temperature in the boiling point distribution at which 50 wt. % of the constituents of the plastic derived oil 102 have transitioned from the liquid phase into the vapor phase.

In embodiments, the plastic derived oil 102 may have a density of from 0.65 g/ml to 1.1 g/ml, such as from 0.65 g/ml to 1.0 g/ml, from 0.65 g/ml to 0.9 g/ml, from 0.65 g/ml to 0.8 g/ml, from 0.7 g/ml to 1.1 g/ml, from 0.7 g/ml to 1.0 g/ml, from 0.7 g/ml to 0.9 g/ml, from 0.7 g/ml to 0.8 g/ml, from 0.75 g/ml to 1.1 g/ml, from 0.75 g/ml to 1.0 g/ml, from 0.75 g/ml to 0.9 g/ml, or from 0.75 g/ml to 0.85 g/ml, as determined by ASTM D4052. In embodiments, the plastic derived oil 102 may have less than or equal to 0.1 wt. % sulfur, as determined by ASTM D4294. In embodiments, the plastic derived oil 102 may have less than 0.01 wt. % Conradson carbon, as determined according to ASTM D4530. In embodiments, the plastic derived oil 102 may have an oxygen content of from 100 ppmw to 10,000 ppmw, such as from 100 ppmw to 7,000 ppmw, from 500 ppmw to 10,000 ppmw, from 500 ppmw to 7000 ppmw, from 1000 to 10,000 ppmw, from 1000 to 7000 ppmw, or from 5000 ppm to 10,000 ppmw. In embodiments, the plastic derived oil 102 may have a moisture content (concentration of water) of less than or equal to 5000 ppmw, less than or equal to 2000 ppmw, less than or equal to 1000 ppmw, less than or equal to 500 ppmw, or less than or equal to 400 ppmw, as determined according to ASTM D6304A. In embodiments, the plastic derived oil 102 may have the properties provided in Table 1.

TABLE 1

Properties of one embodiment of the plastic derived oil 102

| Property | Units | Test Method | Value |
|---|---|---|---|
| Density | g/mL | ASTM D4052 | 0.792 |
| Total Oxygen Concentration | ppmw | Combustion based | 5540 |
| Total Chloride Concentration | ppmw | UOP 779 | 342 |
| Total Sulfur | wt. % | ASTM D4294 | 0.064 |
| Total Nitrogen | ppmw | ASTM D4629 | 1135 |
| Bromine Number | $g(Br_2)/100$ g | ASTM D1159 | 43.3 |
| Silica | ppmw | UOP 407 | 0.109 |
| Sodium | ppmw | UOP 407 | 0.174 |
| Iron | ppmw | UOP 407 | 0.097 |
| Water | ppmw | ASTM D6304A | 299 |
| Conradson Carbon Residue | wt. % | ASTM D4530 | <0.01 |

TABLE 1-continued

Simulated Distillation Table

| Recovery (wt. %) | Units | Test Method | Temperature |
|---|---|---|---|
| SIMDIST - IBP | ° C. | ASTM D2887 | 29.4 |
| SIMDIST - 5 wt. % | ° C. | ASTM D2887 | 77.7 |
| SIMDIST - 10 wt. % | ° C. | ASTM D2887 | 107.1 |
| SIMDIST - 15 wt. % | ° C. | ASTM D2887 | 127.3 |
| SIMDIST - 20 wt. % | ° C. | ASTM D2887 | 139.9 |
| SIMDIST - 25 wt. % | ° C. | ASTM D2887 | 158.7 |
| SIMDIST - 30 wt. % | ° C. | ASTM D2887 | 173.6 |
| SIMDIST - 35 wt. % | ° C. | ASTM D2887 | 188.7 |
| SIMDIST - 40 wt. % | ° C. | ASTM D2887 | 207.9 |
| SIMDIST - 45 wt. % | ° C. | ASTM D2887 | 225.6 |
| SIMDIST - 50 wt. % | ° C. | ASTM D2887 | 240.0 |
| SIMDIST - 55 wt. % | ° C. | ASTM D2887 | 253.9 |
| SIMDIST - 60 wt. % | ° C. | ASTM D2887 | 266.2 |
| SIMDIST - 65 wt. % | ° C. | ASTM D2887 | 279.3 |
| SIMDIST - 70 wt. % | ° C. | ASTM D2887 | 293.8 |
| SIMDIST - 75 wt. % | ° C. | ASTM D2887 | 307.1 |
| SIMDIST - 80 wt. % | ° C. | ASTM D2887 | 320.2 |
| SIMDIST - 85 wt. % | ° C. | ASTM D2887 | 333.7 |
| SIMDIST - 90 wt. % | ° C. | ASTM D2887 | 347.8 |
| SIMDIST - 95 wt. % | ° C. | ASTM D2887 | 364.7 |
| SIMDIST - FBP | ° C. | ASTM D2887 | 405.3 |

Figure 2:
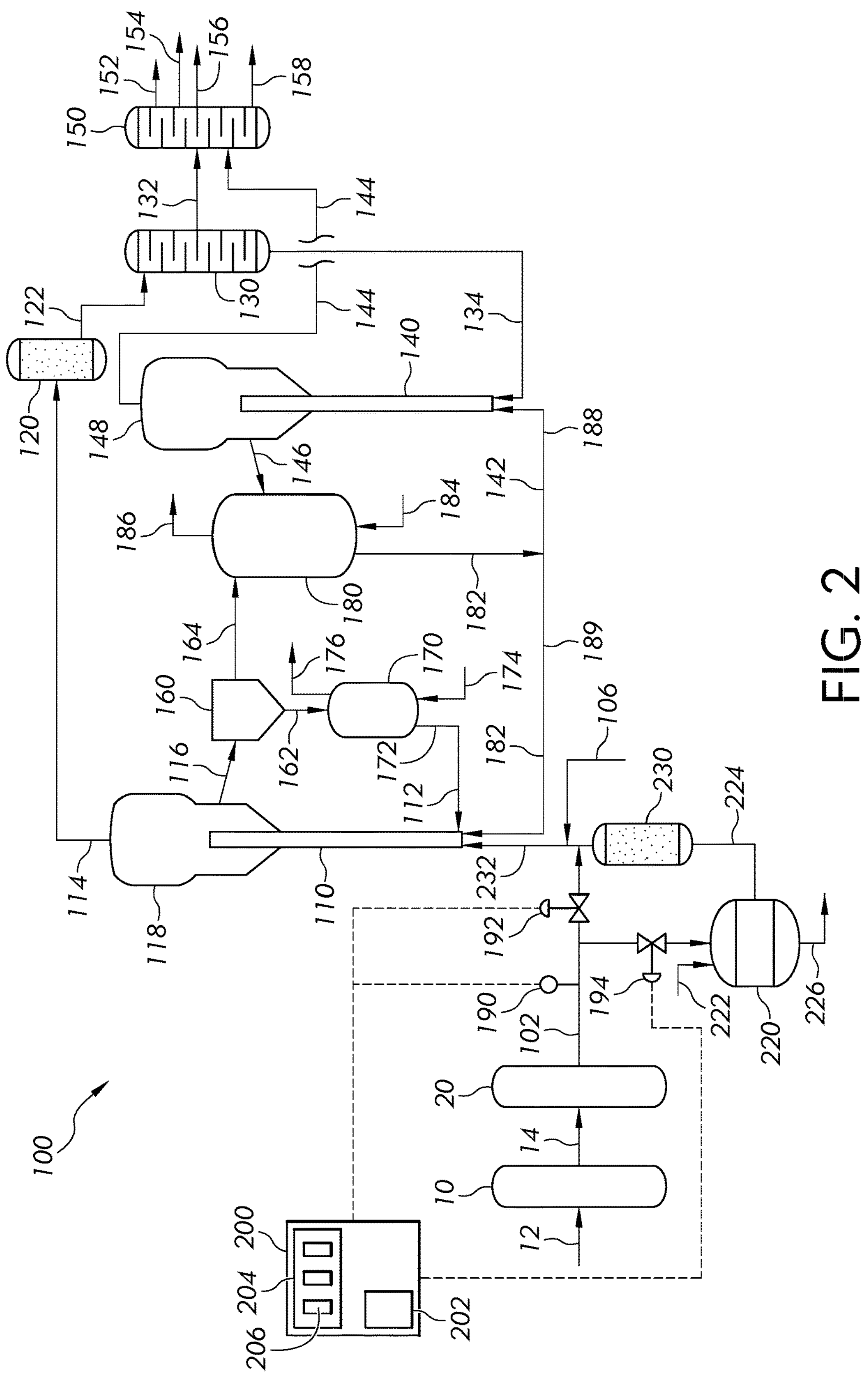
FIG. 2 schematically depicts a generalized flow diagram of another embodiment of a system for upgrading plastic derived oils, according to embodiments shown and described in this disclosure.

The plastic derived oil 102 may be produced from solid waste plastic through melting and dehalogenation followed by pyrolysis. Referring now to FIG. 2, the systems 100 disclosed herein may further include a dehalogenation unit 10 and a pyrolysis reactor 20, both of which may be disposed upstream of the first reactor 110. The dehalogenation unit 10 may be operable to melt solid waste plastic 12 to produce a liquefied plastic stream 14. The liquefied plastic stream 14 may be passed to the pyrolysis reactor 20 downstream of the dehalogenation unit 10. The pyrolysis reactor 20 may be configured to subject the liquidized plastic stream 14 to pyrolysis to produce the plastic derived oil 102. The processes disclosed herein may include producing the plastic derived oil 102 stream from a solid waste plastic 12 by liquefying the solid waste plastic 12 in the dehalogenation unit 10 to produce a liquefied plastic stream 14, passing the liquefied plastic stream 14 to the pyrolysis reactor 20, and subjecting the liquefied plastic stream 14 to pyrolysis to produce the plastic derived oil stream 102.

The solid waste plastic 12 supplied to the dehalogenation unit 10 may comprise a plastic feedstock including mixed solid waste plastics of differing compositions. The solid waste plastic 12 may be a mixture of plastics from various polymer families. In embodiments, the solid waste plastics 12 may comprise plastics representative of one or more of the polymer families, such as but not limited to olefins, carbonates, aromatic polymers, sulfones, fluorinated hydrocarbon polymers, chlorinated hydrocarbon polymers, acrylonitriles, or combinations of these families of polymers. In embodiments, the mixed waste plastics 12 may include polyethylene (PE), polypropylene (PP), diphenylcarbonate, polystyrene (PS), polyether sulfone, polyfluoroethylene (PTFE), polyvinyl chloride (PVC), polyacrylonitrile (PAN), other polymers, or combinations of these. In embodiments, solid waste plastics 12 may be a mixture of high density polyethylene (HDPE, for example, a density of about 0.93 to 0.97 grams per cubic centimeter (g/cm$^3$), low density polyethylene (LDPE, for example, about 0.910 g/cm$^3$ to 0.940 g/cm$^3$), polypropylene (PP), linear low density polyethylene (LLDPE), polystyrene (PS), polyvinyl chloride (PVC), polyethylene terephthalate (PET), or combinations of these polymers. In embodiments, the solid waste plastics 12 may include one or more chlorinated hydrocarbons, such as PVC. The plastics of the solid waste plastics 12 may be natural, synthetic, or semi-synthetic polymers. Utilization of the solid waste plastics 12 comprising a mixture of different types of plastics and polymers may allow for recycling of solid plastics without necessitating fine sorting of the plastics into different types.

The solid waste plastics 12 may be provided in a variety of different forms. In embodiments, the solid waste plastics 12 may be in the form of a powder in smaller scale operations. In embodiments, the solid waste plastics 12 may be in the form of pellets, such as pellets with a particle size of from 1 to 5 millimeter (mm) for larger scale operations. In embodiments, the solid waste plastics 12 may be provided as chopped or ground waste plastics. In embodiments, the system 100 may include a plastic grinding unit (not shown) upstream of the dehalogenation reactor, where the plastic grinding unit may be operable to grind plastic articles into smaller pieces to produce the solid waste plastics 12. In embodiments, the solid waste plastics 12 may comprise waste plastic, manufacturing off-spec product, new plastic products, unused plastic products, or combinations of these.

The dehalogenation unit 10 may be in fluid communication with the solid waste plastics 12 and may be operable to raise the temperature of the solid waste plastics 12 to a temperature between 250° C. and 350° C. to melt the plastics and generate the liquefied plastic stream 14. When the solid waste plastics 12 include halogenated plastics, such as but not limited to PVC, melting the plastics may release some hydrogen halides, such as HCl. The dehalogenation unit 10 may also be operable to scrub HCl and other halogen halides released during melting of the solid waste plastics 12. Removal of some of the chlorine, fluorine, or other halides from the solid waste plastic 12 may reduce the concentration of halides in the liquefied plastic stream 14. As a result, the liquefied plastic stream 14 may have a reduced concentration of chlorine and other halogens compared to the solid waste plastic 12. Reducing the concentration of organic halide compounds in the liquefied plastic stream 14 may reduce corrosion problems in the downstream pyrolysis reactor. However, the liquefied plastic stream 14 may still contain halogen-containing organic compounds and other contaminants.

In embodiments, the dehalogenation reactor 10 may be operable to increase the temperature of the solid waste plastic 12 to a temperature of from 250° C. to 350° C. to melt the solid waste plastic 12 and remove at least a portion of the chlorine and other halogens from the resulting liquefied plastic stream 14. In embodiments, the dehalogenation reactor 10 may be operable to increase the temperature of the solid waste plastic 12 to a temperature of from 250° C. to 325° C., from 275° C. to 350° C., from 275° C. to 325° C., or from 300° C. to 350° C. The temperature of the dehalogenation reactor 10 may be controlled to remove HCl without cracking C—H or C—C bonds.

In embodiments, the HCl and other hydrogen halides released from the liquefied plastic stream 14 may be passed out of the dehalogenation unit 10 as a halogen-rich stream 16. The halogen-rich stream may include hydrogen halides, such as HCl, as well as hydrogen and light hydrocarbon gases, such as but not limited to mono aromatics, hydrogen, methane, and C2-C5 gases. In embodiments, the halogen-rich stream 16 may be scrubbed with water or a sodium hydroxide solution in a downstream acid gas scrubbing unit (not shown) to remove the halogen compounds from the halogen-rich stream 16. In embodiments, the hydrogen halide compounds may be scrubbed within the dehalogenation unit 10, such as by contacting the released gases with adsorbents, such as but not limited to $Al_2O_3$, zeolites, or other chemical removers. In embodiments, the dehalogenation unit 10 may include a melting reactor and an acid gas scrubber downstream of the melting reactor. In embodiments, a single unit forming the dehalogenation unit 10 may achieve both melting of the plastic solid plastic and scrubbing to remove hydrogen halides. Organic halide compounds not released during dehalogenation in the dehalogenation unit 10 may be passed onward in the liquefied plastic stream 14 to the pyrolysis rector 20.

Referring again to FIG. 2, the pyrolysis reactor 20 may be disposed downstream of the dehalogenation unit 10 and in fluid communication with the liquefied plastic stream 14 discharged from the dehalogenation unit 10. The pyrolysis reactor 20 may be operable to increase the temperature of the liquefied plastic stream 14 to a temperature of from 300° C. to 1000° C. to convert the liquefied plastic stream 14 to the plastic derived oil stream 102. In particular, the pyrolysis of the liquefied plastic stream 14 in the pyrolysis reactor 20 may cause at least a portion of the long chain polymers in the liquefied plastic stream 14 to break apart into smaller fragments comprising organic compounds having smaller average molecular weight compared to the long chain polymers in the liquefied plastic stream 14.

The specific reactor used as the pyrolysis reactor 20 can be of different types and are not limited for the purposes of the present disclosure. Typical reactor types that can be used to serve the function of the pyrolysis reactor 20 can include but are not limited to tank reactors, rotary kilns, packed beds, bubbling bed reactors, or other types of reactors. In embodiments, the pyrolysis of the liquefied plastic stream 14 in the pyrolysis reactor 20 may be performed in the presence or absence of a pyrolysis catalyst at a temperature of from 300° C. to 1000° C. In embodiments, the pyrolysis reactor 20 may operate at a low severity at a temperature less than or equal to 450° C. or at a high severity at a temperature greater than 450° C. In embodiments, the pyrolysis reactor 20 may be operated at a temperature of from 400° C. to 600° C., from 400° C. to 500° C., from 400° C. to 450° C., from 450° C. to 500° C., or from 425° C. to 475° C. In embodiments, the pyrolysis reactor 20 may be operated at a pressure in the range of 1 bar to 100 bars (100 kilopascals (kPa) to 10,000 kPa), from 1 bar to 50 bars (100 kPa to 5000 kPa), from 1 bar to 25 bars (1 kPa to 2500 kPa), or from 1 bar to 10 bars (1 kPa to 1000 kPa). Further, in various embodiments, the residence time of the liquefied plastic stream 14 in the pyrolysis reactor 20 may be from 1 second to 3600 seconds, from 60 seconds to 1800 seconds, or from 60 seconds to 900 seconds. The plastic derived oil 102 may be passed out of the pyrolysis reactor 20.

Referring again to FIG. 1, the plastic derived oil 102 may be passed to the first reactor 110. In embodiments, the first reactor 110 may be downstream of the pyrolysis reactor 20 and in fluid communication with the pyrolysis reactor 20 to pass the plastic derived oil 102 from the pyrolysis reactor 20 to the first reactor 110. The first reactor 110 may comprise a mixed catalyst comprising a mixture of the decontamination catalyst 112 and the cracking catalyst (such as regenerated cracking catalyst 182). The first reactor 110 may be any type of reactor capable of contacting the plastic derived oil 102 with the mixed catalyst at reaction conditions sufficient to remove halogens and other contaminants from the plastic derived oil 102 to produce the first reactor effluent 114. The reaction conditions may be selected to cause halogen-containing organic compounds to react with the decontamination catalyst 112 to form hydrogen halides and hydrocarbons and to cause at least a portion of the resulting hydrogen halides to be adsorbed into the decontamination catalyst 112 to produce a first reactor effluent 114 having a reduced concentration of halogen-containing compounds and other contaminants compared to the plastic derived oil 102. Adsorption of the hydrogen halides onto the decontamination catalyst 112 may produce metal halides at the surfaces of the used decontamination catalyst. As previously discussed, contact of heavy compounds with the cracking catalyst portion of the mixed catalyst may cause at least a portion of the heavy compounds to be converted to light oils and hydrocarbon gases, which may increase access of halogen-containing compounds to the decontamination catalyst 112 and increase removal of the halogen-containing compounds from the plastic derived oil stream 102.

The first reactor 110 may be a fluidized bed reactor. The first reactor 110 may include one or a plurality of fluidized bed reactors. When the first reactor 110 comprises a plurality of reactors, the plurality of reactors may be in series or in parallel. In embodiments, the first reactor 110 is a fluidized bed reactor in which the plastic derived oil 102 and the mixed catalyst are combined together at one end of the reactor and flow co-currently through the fluidized bed reactor to an outlet of the first reactor 110. The first reactor 110 may be a riser reactor or a downer reactor. In embodiments, the first reactor 110 may be a riser reactor.

As previously discussed, the first reactor 110 may include a mixed catalyst. The mixed catalyst is a mixture of the decontamination catalyst 112 and the cracking catalyst, such as the regenerated cracking catalyst 182 in FIG. 1. The decontamination catalyst 112 may be a mixed metal oxide (MMO) catalyst. The MMO catalyst may comprise a plurality of metal oxides, where each of the metal oxides are randomly distributed throughout the MMO catalyst. When the decontamination catalyst 112 is an MMO catalyst, the metal oxides of the MMO catalyst may be metal oxides that promote reaction of halogen-containing organic compounds to produce hydrogen halides and organic compounds and that adsorb hydrogen halides, such as but not limited to HCl. The plurality of metal oxides of the MMO catalyst may include oxides of alkali metals, alkaline earth metals, metals in groups 3-13 of the International Union of Pure and Applied Chemistry (IUPAC) periodic table, or combinations of these. In embodiments, the MMO particles may also include oxides of metalloids, such as oxides of silicon. As used herein, the term "metal oxide" includes metalloid oxides. In embodiments, the plurality of metal oxides of the MMO particles may include a combination of oxides of calcium, magnesium, sodium, iron, zirconium, cerium, aluminum, tungsten, molybdenum, titanium, silicon, or combinations thereof. In embodiments, the MMO catalyst comprises a plurality of the metal oxides selected from the group consisting of $Fe_2O_3$, $ZrO_2$, $CeO_2$, $Al_2O_3$, $TiO_2$, CaO, $SiO_2$, $Na_2O$, MgO, and combinations thereof.

The MMO catalyst may comprises a plurality of mixed metal oxide (MMO) particles. Each of the plurality of MMO particles may include a plurality of metal oxides that are different from one another. The MMO particles may comprise one or more of the metal oxides randomly distributed throughout the MMO particles. The MMO particles of the mixed metal oxide catalyst 112 may include $Fe_2O_3$ as one of the plurality of metal oxides. In embodiments, the MMO particles may include from 0 wt. % to 95 wt. % $Fe_2O_3$, such as from 0 wt. % to 90 wt. %, from 0 wt. % to 75 wt. %, from 0 wt. % to 60 wt. %, from 1 wt. % to 95 wt. %, from 1 wt. % to 90 wt. %, from 1 wt. % to 75 wt. %, from 1 wt. % to 60 wt. %, from 5 wt. % to 95 wt. %, from 1 wt. % to 90 wt. %, from 1 wt. % to 75 wt. %, from 1 wt. % to 60 wt. %, from 15 wt. % to 95 wt. %, from 15 wt. % to 90 wt. %, from 15 wt. % to 75 wt. %, or from 15 wt. % to 60 wt. % $Fe_2O_3$ based on the total weight of the MMO particles. The MMO particles may include $ZrO_2$ as one of the plurality of metal oxides. In embodiments, the MMO particles may include from 0 wt. % to 20 wt. % $ZrO_2$, such as from 0 wt. % to 15 wt. %, from 0 wt. % to 12.5 wt. %, from 0 wt. % to 10 wt. %, from 1 wt. % to 20 wt. %, from 1 wt. % to 15 wt. %, from 1 wt. % to 10 wt. %, or from 5 wt. % to 20 wt. % $ZrO_2$ based on the total weight of the MMO particles. The MMO particles may include $CeO_2$ as one of the plurality of metal oxides. In embodiments, the MMO particles may include from 0 wt. % to 10 wt. % $CeO_2$, such as from 0 wt. % to 7.5 wt. %, from 0 wt. % to 5 wt. %, from 0.1 wt. % to 10 wt. %, from 0.1 wt. % to 7.5 wt. %, from 0.1 wt. % to 5 wt. %, from 0.5 wt. % to 10 wt. %, from 0.5 wt. % to 7.5 wt. %, from 0.5 wt. % to 5 wt. %, from 1 wt. % to 10 wt. %, or from 1 wt. % to 5 wt. % of the $CeO_2$ based on the total weight of the MMO particles. The MMO particles may include $Al_2O_3$ (alumina) as one of the plurality of metal oxides. In embodiments, the MMO particles may include from 1 wt. % to 50 wt. % $Al_2O_3$, such as from 1 wt. % to 40 wt. %, from 1 wt. % to 30 wt. %, from 1 wt. % to 20 wt. %, from 5 wt. % to 50 wt. %, from 5 wt. % to 40 wt. %, from 5 wt. % to 30 wt. %, from 5 wt. % to 20 wt. %, from 8 wt. % to 50 wt. %, from 8 wt. % to 40 wt. %, from 8 wt. % to 30 wt. %, or from 8 wt. % to 20 wt. % of the $Al_2O_3$ based on the total weight of the MMO particles. The MMO particles may include $TiO_2$ as one of the plurality of metal oxides. In embodiments, the MMO particles may include from 0 wt. % to 15 wt. % $TiO_2$, such as from 0 wt. % to 10 wt. %, from 0 wt. % to 5 wt. %, from 0.1 wt. % to 15 wt. %, from 0.1 wt. % to 10 wt. %, from 0.1 wt. % to 5 wt. %, from 1 wt. % to 15 wt. %, from 1 wt. % to 10 wt. %, from 1 wt. % to 5 wt. %, from 5 wt. % to 15 wt. %, or from 5 wt. % to 10 wt. % of the $TiO_2$ based on the total weight of the MMO particles.

The MMO particles may include CaO as one of the plurality of metal oxides. In embodiments, the MMO particles may include from 0 wt. % to 50 wt. % of the CaO, such as from 0 wt. % to 40 wt. %, from 0 wt. % to 35 wt. %, from 0 wt. % to 30 wt. %, from 2 wt. % to 50 wt. %, from 2 wt. % to 40 wt. %, from 2 wt. % to 35 wt. %, from 2 wt. % to 30 wt. %, from 2 wt. % to 15 wt. %, from 10 wt. % to 50 wt. %, from 10 wt. % to 40 wt. %, from 10 wt. % to 35 wt. %, from 10 wt. % to 30 wt. %, or from 14 wt % to 50 wt. % of the CaO based on the total weight of the MMO particles. The MMO particles may include MgO as one of the plurality of metal oxides. In embodiments, the MMO particles may include from 0 wt. % to 20 wt. % MgO, such as from 0 wt. % to 18 wt. %, from 0 wt. % to 15 wt. %, from 0.1 wt. % to 20 wt. %, from 0.1 wt. % to 18 wt. %, from 0.1 wt. % to 15 wt. %, from 1 wt. % to 20 wt. %, from 1 wt. % to 18 wt. %, or from 1 wt. % to 15 wt. % of the MgO based on the total weight of the MMO particles. The MMO particles may include $Na_2O$ as one of the plurality of metal oxides. In embodiments, the MMO particles may include from 0 wt. % to 10 wt. % $CeO_2$, such as from 0 wt. % to 7.5 wt. %, from 0 wt. % to 5 wt. %, from 0.1 wt. % to 10 wt. %, from 0.1 wt. % to 7.5 wt. %, from 0.1 wt. % to 5 wt. %, from 0.5 wt. % to 10 wt. %, from 0.5 wt. % to 7.5 wt. %, from 0.5 wt. % to 5 wt. %, from 1 wt. % to 10 wt. %, or from 1 wt. % to 5 wt. % of the $Na_2O$ based on the total weight of the MMO particles. The MMO particles may include $SiO_2$ as one of the plurality of metal oxides. In embodiments, the MMO particles may include from 0 wt. % to 50 wt. % $SiO_2$, such as from 0 wt. % to 40 wt. %, from 0 wt. % to 30 wt. %, from 1 wt. % to 50 wt. %, from 1 wt. % to 40 wt. %, from 1 wt. % to 30 wt. %, from 3 wt. % to 50 wt. %, from 3 wt. % to 40 wt. %, from 3 wt. % to 30 wt. %, from 6 wt. % to 50 wt. %, or from 6 wt. % to 40 wt. % of the $SiO_2$ based on the total weight of the MMO particles.

In embodiments, the MMO catalyst may comprise MMO particles comprising red mud, cement raw meal, cement slag, co-precipitated MMO particles, or combinations of these. In embodiments, the MMO particles of the MMO catalyst may comprise red mud that comprises from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud. In embodiments, the MMO particles of the MMO catalyst may comprise cement raw meal that comprises from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal. In embodiments, the MMO particles of the MMO catalyst may comprise cement slag that comprises from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag. In embodiments, the MMO particles of the MMO catalyst may comprise co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst.

In embodiments, the MMO catalyst may comprise a mixture of MMO particles, where each of the MMO particles comprises one or more of the metal oxide constituents of the MMO catalyst. In embodiments, the MMO particles may include the plurality of metal oxides mixed and fused or agglomerated together to form the MMO particles comprising a homogeneous solid mixture of the metal oxides instead of one or more metal oxides deposited on a surface of a support material. In embodiments, the MMO particles may be prepared by a co-precipitation method to produce the MMO particles comprising each of the plurality of different metal oxides distributed throughout the MMO particles. In embodiments, the MMO particles may be pulverized to form a powder.

In embodiments, the MMO particles may be nanoparticles, which may have a largest dimension of from 20 nm to 200 nm. In embodiments, the MMO particles may be non-porous. Without being limited by theory, it is believed that hydrocarbons may only interact with the surface of the MMO particles. Thus, the increased surface area provided by the nano-particulate nature of the mixed metal oxide catalyst may help to achieve sufficient reaction rates.

The MMO particles, in the form of a powder, may be combined with other materials, such as but not limited to binder materials, extrusion additives, or other materials, extruded, and calcined to form the decontamination catalyst 112 in the form of catalyst pellets. In embodiments, the MMO particles, in powder form, may be combined and mixed with a binder material and methylcellulose to produce a solid mixture. The binder materials may comprise silica, alumina, silica-alumina, a clay, or any combinations of these. The alumina may comprise an acid peptized alumina. The silica-alumina may comprise an amorphous silica-alumina. Clays may include, but are not limited to, kaolin, montmorilonite, halloysite, bentonite, or combinations of these. In embodiments, the binder material may comprise bentonite, silica, or combinations of these. In embodiments, the decontamination catalyst 112 may comprise bentonite as the binder. The methylcellulose may be added to the solid mixture to facilitate extrusion, but may be burned off during calcination. In embodiments, the decontamination catalyst 112 pellets, after calcining, may comprise, consist of, or consist essentially of the MMO particles and the binder.

As previously discussed, the mixed catalyst in the first reactor 110 further includes the cracking catalyst. The cracking catalyst is different from the decontamination catalyst 112. The cracking catalyst may be the same as the cracking catalyst 142 used in the second reactor 140. In embodiments, the cracking catalyst in the mixed catalyst may be a portion of the regenerated cracking catalyst 182 passed from the cracking catalyst regenerator 180 to the first reactor 110. The cracking catalyst in the mixed catalyst may have any of the features, compositions, or properties described in the present disclosure for the cracking catalyst 142.

The decontamination catalyst 112 and the cracking catalyst, such as the regenerated cracking catalyst 182, may be mixed upstream of the first reactor 110 or may be passed separately to the inlet end of the first reactor 110 and mixed within the first reactor 110 to produce the mixed catalyst. When mixed upstream of the first reactor 110, the decontamination catalyst 112 and the regenerated cracking catalyst 182 may be combined in a hopper (not shown) upstream of the first reactor 110 to produce the mixed catalyst. Due to the different regeneration conditions, the hopper may allow for the temperatures of the decontamination catalyst 112 and regenerated cracking catalyst 182 to equilibrate before introducing the mixed catalyst into the first reactor 110.

The mixed catalyst may have a catalyst weight ratio of the cracking catalyst to the decontamination catalyst of less than or equal to 1, such as less than or equal to 0.9, less than or equal to 0.8, less than or equal to 0.7, less than or equal to 0.6, less than or equal to 0.5, or less than or equal to 0.4, where the catalyst weight ratio is a mass flow rate of the cracking catalyst through the first reactor 110 divided by a mass flow rate of the decontamination catalyst 112 through the first reactor 110. The catalyst weight ratio may be sufficient to enable cracking of heavy hydrocarbons in the plastic derived oil stream 102 to increase access of the decontamination catalyst 112 to the halogen-containing compounds. In embodiments, the mixed catalyst in the first reactor 110 may have a catalyst weight ratio of from greater than 0 to 1, from greater than 0 to 0.9, from greater than 0 to 0.8, from greater than 0 to 0.7, from greater than 0 to 0.7, from greater than 0 to 0.6, from greater than 0 to 0.5, from greater than 0 to 0.4, from 0.1 to 1.0, from 0.1 to 0.9, from 0.1 to 0.8, from 0.1 to 0.7, from 0.1 to 0.6, from 0.1 to 0.5, from 0.1 to 0.4, from 0.2 to 1, from 0.2 to 0.9, from 0.2 to 0.8, from 0.2 to 0.7, from 0.2 to 0.6, from 0.2 to 0.5, or from 0.2 to 0.4, from 0.4 to 1, from 0.4 to 0.9 from 0.4 to 0.8, from 0.4 to 0.7, from 0.5 to 1, from 0.5 to 0.9, from 0.5 to 0.8, from 0.5 to 0.7, or from 0.6 to 1. When the catalyst weight ratio is greater than about 1, the proportion of the decontamination catalyst 112 in the first reactor 110 may not be sufficient to effectively remove halogen-containing compounds from the plastic derived oil stream 102.

The catalyst weight ratio can be modified depending on the properties of the plastic derived oil 102, such as the concentration of halogen-containing compounds in the plastic derived oil 102, the concentration of heavy compounds in the plastic derived oil 102, or combinations of these properties. Heavy compounds refer to compounds in the plastic derived oil 102 having boiling point temperatures greater than or equal to about 343° C. When the concentration of the heavy compounds in the plastic derived oil 102 increases, the catalyst weight ratio may be increased by increasing the amount of cracking catalyst relative to the decontamination catalyst in the mixed catalyst. The increased proportion of the cracking catalyst in the mixed catalyst may initiate a greater degree of pre-cracking of the heavy compounds in the plastic derived oil 102, which may increase the amount of halogen-containing compounds accessible to the decontamination catalyst and increase the amount of the halogen-containing compounds removed from the plastic derived oil 102. Conversely, when the concentration of heavy compounds in the plastic derived oil 102 decreases or is less, the catalyst weight ratio may be decreased, such as by decreasing the amount of the cracking catalyst relative to the decontamination catalyst in the mixed catalyst. When the concentration of heavy compounds in the plastic derived oil 102 is less, then the need for pre-cracking the heavy compounds is less, which requires less of the cracking catalyst.

In embodiments, the processes herein may include adjusting the catalyst weight ratio in the first reactor 110 based on a concentration of heavy compounds in the plastic derived oil stream 102. Adjusting the catalyst weight ratio in the first reactor 110 may include determining a concentration of heavy compounds in the plastic derived oil stream 102 and adjusting a mass flow rate of the decontamination catalyst 112, the cracking catalyst 142 (regenerated cracking catalyst 182), or both to the first reactor 110. The catalyst weight ratio in the first reactor 110 may be adjusted in proportion to the concentration of heavy compounds in the plastic derived oil stream 102.

The catalyst weight ratio of the mixed catalyst may also be modified based on the concentration of halogen-containing compounds in the plastic derived oil 102. For instance, when the concentration of halogen-containing compounds increases or is high, then the catalyst weight ratio can be reduced, such as by decreasing the amount of the cracking catalyst relative to the decontamination catalyst in the mixed catalyst. Reducing the catalyst weight ratio may increase the proportion of decontamination catalyst to increase the decontamination achieved in the first reactor. Decreasing the catalyst weight ratio by reducing the amount of cracking catalyst in the mixed catalyst may also reduce the amount of the cracking catalyst exposed to the halogen-containing compounds, which can reduce deactivation of the cracking catalyst, as previously discussed. Conversely, when the concentration of halogen-containing compounds in the plastic derived oil 102 is less or reduced, the catalyst weight ratio in the mixed catalyst can be increased, such as by increasing an amount of the cracking catalyst relative to the amount of decontamination catalyst in the mixed catalyst. Increasing the proportion of the cracking catalyst in the mixed catalyst my increase the degree of pre-cracking of heavier hydrocarbons in the plastic derived oil stream 102.

In embodiments, the processes herein may include adjusting the catalyst weight ratio in the first reactor 110 based on a concentration of halogen-containing compounds in the plastic derived oil stream 102. Adjusting the catalyst weight ratio in the first reactor 110 may include determining a concentration of halogen-containing compounds in the plastic derived oil stream 102 and adjusting a mass flow rate of the decontamination catalyst 112, the cracking catalyst 142, or both to the first reactor 110. The catalyst weight ratio in the first reactor 110 may be adjusted in proportion to the concentration of halogen-containing compounds in the plastic derived oil stream 102.

Referring again to FIG. 1, in embodiments, a supplemental feed stream 106 may be introduced to the first reactor 110 or combined with the plastic derived oil 102 upstream of the first reactor 110. In embodiments, the hydrocarbons introduced to the first reactor 110 may comprise from 0.1 wt. % to 100 wt. % of the plastic derived oil 102, such as from 20 wt. % to 100 wt. %, from 40 wt. % to 100 wt. %, from 60 wt. % to 100 wt. %, from 80 wt. % to 100 wt. %, or substantially 100 wt. % plastic derived oil based on the total weight of hydrocarbons introduced to the first reactor 110. When the concentration of the plastic derived oil 102 in the feed to the first reactor 110 is less than 100 wt. %, then the remainder may comprise the supplemental feed stream 106. The supplemental feed stream 106 may comprise hydrocarbons and may be a conventional fluid catalytic cracking feedstock stream, such as but not limited to hydrocracker bottoms, virgin or hydrotreated vacuum gas oil, deasphalted oil (DAO), coker gas oil, cycle oil, visbreaker oil, atmospheric residue, vacuum residue, or combinations of these. It is further noted, when the first reactor 110 is a fluidized bed reactor, the catalyst-to-oil ratio for the first reactor 110 may be calculated as the mass flow rate of the decontamination catalyst 112 entering the first reactor 110 divided by a total mass flow rate of hydrocarbons into the first reactor 110, which includes the plastic derived oil stream 102 and any supplemental feed stream 106. The processes disclosed herein may include passing the supplemental feed stream 106 to the first reactor 110 or combining the supplemental feed stream 106 with the plastic derived oil stream 102 upstream of the first reactor 110.

The first reactor 110 may be operable to contact the plastic derived oil 102, and optionally the supplemental feed stream 106, with the mixed catalyst at a temperature of from 300 degrees Celsius (° C.) to 450° C. and at a pressure of from 101 kilopascals (kPa) to 303 kPa, or at atmospheric pressure (~101 kPa). In embodiments, the first reactor 110 is a fluidized bed reactor, and the first reactor may be operable to contact the plastic derived oil stream 102, and optionally the supplemental feed stream 106, with the mixed catalyst at a catalyst-to-oil weight ratio of greater than or equal to 0.2, such as from 0.2 to 10. The catalyst-to-oil weight ratio in the first reactor 110 may be equal to an average ratio of a mass flow rate of the mixed catalyst through the first reactor 110 divided by a mass flow rate of the hydrocarbons in the first reactor 110 during steady state operation of the first reactor 110.

The catalyst-to-oil weight ratio in the first reactor 110 may be adjusted based on the concentration of halogen-containing compounds in the plastic derived oil 102. In particular, the catalyst-to-oil weight ratio in the first reactor 110 may be increased in response to greater concentrations of halogen-containing compounds in the plastic derived oil stream 102 and reduced in response to lesser concentrations of halogen-containing compounds in the plastic derived oil stream 102. In embodiments, the processes herein may include adjusting the catalyst-to-oil weight ratio in the first reactor 110 based on a concentration of halogen-containing compounds in the plastic derived oil stream 102. Adjusting the catalyst-to-oil weight ratio in the first reactor 110 may include determining a concentration of halogen-containing compounds in the plastic derived oil stream 102 and adjusting a mass flow rate of the plastic derived oil stream 102, a mass flow rate of the mixed catalyst, or both to the first reactor 110. The catalyst-to-oil weight ratio in the first reactor 110 may be adjusted in proportion to the concentration of halogen-containing compounds in the plastic derived oil stream 102.

In embodiments, the first reactor effluent 114 may be separated from the used mixed catalyst 116 at or proximate to an outlet end of the first reactor 110. Referring again to FIG. 1, in embodiments, the reaction mixture, which may include the first reactor effluent 114 and the used mixed catalyst 116, may be passed out of the first reactor 110 to the first fluid-solid separation unit 118. As previously discussed, the first fluid-solid separation unit 118 may be disposed at the outlet end of the first reactor 110. The first fluid-solid separation unit 118 may be configured to separate the first reactor effluent 114 from the solid particles of the used mixed catalyst 116. The first reactor effluent 114 is in a fluid phase (generally a vapor phase) the reaction conditions of the first reactor). In FIG. 1, the first fluid-solid separation unit 118 is depicted as a vessel disposed at the outlet end of the first reactor 110, where the vessel changes the fluid velocity in a manner that allows the solid particles of the used mixed catalyst 116 to separate and settle out from the fluid phase. The solid particles of the used mixed catalyst 116 may settle in the bottom of the first fluid-solid separation unit 118, and the first reactor effluent 114 may pass out of a top portion of the first fluid-solid separation unit 118. In embodiments, the first fluid-solid separation unit 118 may further include one or more downstream cyclones, filters, or other unit operation (not shown) that may be configured to remove catalyst fines from the first reactor effluent 114. Other types of fluid-solid separation devices are contemplated for the first fluid-solid separation unit 118. The used mixed catalyst 116 may be passed from the first fluid-solid separation unit 118 to the catalyst separator 160 for separation into the used decontamination catalyst 162 and the second used cracking catalyst 164.

The first reactor effluent 114 may have a concentration of halogen-containing compounds less than the plastic derived oil stream 102 upstream of the first reactor 110. In embodiments, the first reactor effluent 114 may have a concentration of halogen-containing compounds of less than 100 ppmw, such as less than 50 ppmw, less than 20 ppmw, less than 10 ppmw. In embodiments, the first reactor effluent 114 may have a concentration of halogen-containing compounds of from 1 ppmw to 100 ppmw, from 1 ppmw to 80 ppmw, from 1 ppmw to 50 mm, from 1 ppmw to 20 ppmw, from 1 ppmw to 10 ppmw, from 5 ppmw to 100 ppmw, from 5 ppmw to 80 ppmw, from 5 ppmw to 50 ppmw, from 5 ppmw to 20 ppmw, from 5 ppmw to 10 ppmw, from 10 ppmw to 100 ppmw, from 10 ppmw to 80 ppmw, from 10 ppmw to 50 mm, from 10 ppmw to 20 ppmw, from 20 ppmw to 100 ppmw, from 20 ppmw to 80 ppmw, from 20 ppmw to 50 mm, from 50 ppmw to 100 ppmw, or from 50 ppmw to 80 ppmw based on the unit weight of the first reactor effluent 114.

Referring again to FIG. 1, the first reactor effluent 114 may be passed to the adsorption unit 120 disposed downstream from the first reactor 110. The adsorption unit 120 may be operable to contact the first reactor effluent 114 with an adsorbent in one or more adsorbent beds to remove residual halogen-containing compounds, such as chloride compounds, to produce a treated first reactor effluent 122. The adsorption unit 120 may comprise an adsorbent in at least one adsorbent bed. In embodiments, the adsorption unit 120 may include a plurality of adsorbent beds operated on parallel so that one or more adsorbent beds can be operated while one or more other adsorbent beds are taken offline for regeneration or replacement of the adsorbents. The adsorbents may include but are not limited to alumina, zeolites, activated carbon, metal oxides capable of adsorbing hydrogen halides and other halogen-containing compounds, or combinations of these.

The treated first reactor effluent 122 may be passed out of the adsorption unit 120. The treated first reactor effluent 122 may have a concentration of halogen-containing compounds less than the concentration of halogen-containing compounds in the first reactor effluent 114. In embodiments, the treated first reactor effluent 122 may have a concentration of halogen-containing compounds less than 50 ppmw, less than 20 ppmw, less than 10 ppmw, less than 5 ppmw, less than 1 ppmw, from 0 ppmw to 50 ppmw, from 0 ppmw to 20 ppmw, from 0 ppmw to 10 ppmw, from 0 ppmw to 5 ppmw, from 0 ppmw to 1 ppmw, from 0 ppmw to 0.5 ppmw, or from 0 ppmw to 0.1 ppmw based on the unit weight of the treated first reactor effluent 122.

Referring again to FIG. 1, the treated first reactor effluent 122 may be passed to a first reactor effluent separation system 130, which may be disposed downstream from the first reactor 110, the adsorption unit 120, or both and upstream of the second reactor 140. In embodiments, the treated first reactor effluent 122 may be passed from the adsorption unit 120 to the first reactor effluent separation system 130. The first reactor effluent separation system 130 may be operable to separate the treated first reactor effluent 122 to produce a light effluent 132 and a heavy stream 134. The first reactor effluent separation system 130 can include one or a plurality of separation units, which, collectively, operate to separate the treated first reactor effluent 122 into the light effluent 132 and the heavy stream 134. The processes disclosed herein may include separating the treated first reactor effluent 122 in the first reactor effluent separation system 130 to produce the light effluent 132 and the heavy stream 134 and passing the heavy stream 134 to the second reactor 140. The first reactor effluent separation system 130 may be operated at a cut point temperature sufficient to condense liquid fractions comprising hydrocarbons having greater than or equal to 5 carbon atoms, such as a cut point temperature of from 0 (zero)° C. to 25° C., at atmospheric pressure.

The light effluent 132 may comprise constituents of the treated first reactor effluent 122 having boiling point temperatures less than or equal to 25° C., less than or equal to 10° C., less than or equal to 4° C., or even less than or equal to 0° C. The light effluent 132 may include greater than or equal to 90%, greater than or equal to 95%, greater than or equal to 98%, greater than or equal to 99%, or even greater than or equal to 99.5% by weight of the constituents of the treated first reactor effluent 122 having boiling point temperatures less than the cut point temperature of the first reactor effluent separation system 130. The light effluent 132 may include non-condensable hydrocarbon gases, such as but not limited to hydrocarbons having from 1-4 carbon atoms. The light effluent 132 may include alkanes, alkenes, and alkynes having from 1-4 carbon atoms, such as but not limited to methane, ethane, ethylene, propane, propylene, butane, isobutane, mixed butenes, or combinations of these. The light effluent 132 may also include other gaseous compounds such as but not limited to any hydrogen produced in the first reactor 110 or inert gases, such as but not limited to nitrogen, passing through the first reactor 110.

The heavy stream 134 may comprise the constituents from the treated first reactor effluent 122 having boiling point temperatures greater than 25° C. The heavy stream 134 may include greater than or equal to 90%, greater than or equal to 95%, greater than or equal to 98%, greater than or equal to 99%, or even greater than or equal to 99.5% by weight of the constituents of the treated first reactor effluent 122 having boiling point temperatures greater than the cut point temperature of the first reactor effluent separation system 130, such as greater than 25° C. The heavy stream 134 may comprise hydrocarbons having greater than or equal to 5 carbon atoms. The heavy stream 134 may be passed from the first reactor effluent separation system 130 to the second reactor 140. The light effluent 132 may be passed downstream to the product separation system 150.

Referring again to FIG. 1, the heavy stream 134 may be passed to the second reactor 140. The second reactor 140 may be downstream of the first reactor 110, the adsorption unit 120, the first reactor effluent separation system 130, or any combination of these unit operations. In embodiments, the second reactor 140 may be downstream of the first reactor effluent separation system 130 and in fluid communication therewith to pass the heavy stream 134 directly from the first reactor effluent separation system 130 to the second reactor 140. The second reactor 140 may be a cracking reactor and may comprise the cracking catalyst 142. The second reactor 140 may be configured to contact the heavy stream 134 with the cracking catalyst 142 at reaction conditions sufficient to cause at least a portion of the hydrocarbons in the heavy stream 134 to undergo cracking reactions to produce a second reactor effluent 144 comprising a greater concentration of light olefins, light aromatic compounds, naphtha range hydrocarbons, gasoline or fuel blending constituents, or combinations of these compared to the heavy stream 134.

The second reactor 140 may be a fluidized bed reactor. The second reactor 140 may include one or a plurality of reactors. When the second reactor 140 comprises a plurality of reactors, the plurality of reactors may be in series or in parallel. In embodiments, the second reactor 140 may be a fluidized bed reactor in which the heavy stream 134 and the cracking catalyst 142 are combined together at one end of the reactor and flow co-currently through the fluidized bed reactor to a catalyst separation zone disposed at an outlet of the second reactor 140. When the second reactor 140 is a fluidized bed reactor, the second reactor 140 may be a riser reactor or a downer reactor. In embodiments, the second reactor 140 may be a riser reactor. When the second reactor 140 is a fluidized bed reactor, the used cracking catalyst 146 may be separated from the second reactor effluent 144 and regenerated in the cracking catalyst regenerator 170.

The cracking catalyst 142 utilized in the second reactor 140 may be any conventional cracking catalyst known to those skilled in the art for catalyzing cracking reactions of hydrocarbons. The cracking catalyst 142 is different from the decontamination catalyst 112. In embodiments, the cracking catalyst 142 may comprise a zeolite catalyst, such as but not limited to a USY zeolite, a ZSM-5 zeolite, or a combination of multiple types of suitable zeolite catalysts. Alternatively, or additionally, the cracking catalyst 142 may comprise other suitable solid acid catalysts. In embodiments, the cracking catalyst 142 may comprise fresh cracking catalyst, regenerated cracking catalyst 172, or combinations of fresh and regenerated cracking catalyst. In embodiments, the cracking catalyst 142 may comprise one or more binders, cracking promoters, matrix materials, or other constituents to modify the physical or chemical properties such as catalyst attrition index and catalyst density. In embodiments, the solid cracking catalyst 142 may be a USY zeolite and may include a ZSM-5 cracking additive to enhance light olefin yield. Other cracking catalysts may also be suitable for the cracking catalyst 142 in the second reactor 140.

The second reactor 140 may be operable to contact the heavy stream 134 with the cracking catalyst 142 at a temperature of from 500° C. to 650° C. and at a pressure of from 101 kPa to 303 kPa, or at about 101 kPa (atmospheric pressure). In embodiments, the second reactor 140 may be a fluidized bed reactor, and the second reactor 114 may be operable to contact the heavy stream 134 with the cracking catalyst 142 at a catalyst-to-oil weight ratio of greater than or equal to 2, such as from 2 to 20. The catalyst-to-oil weight ratio in the second reactor 140 may be equal to an average ratio of a weight of the cracking catalyst 142 divided by a weight of the hydrocarbons in the second reactor 140 averaged over time at steady state. The processes disclosed herein may include contacting at least a portion of the treated first reactor effluent 122, such as the heavy stream 134, with the cracking catalyst 134 in the second reactor 140 at a temperature of from 500° C. to 650° C., at a pressure of 101 kPa (1 atm), and at a catalyst-to-oil weight ratio of 2.

In embodiments, the second reactor effluent 144 may be separated from the first used cracking catalyst 146 at or proximate to an outlet of the second reactor 140. Referring again to FIG. 1, in embodiments, the reaction mixture in the second reactor 140, which includes the second reactor effluent 144 and first used cracking catalyst 146, may be passed out of the second reactor 140 to the second fluid-solid separation unit 148. As previously discussed, the second fluid-solid separation unit 148 may be disposed at the outlet end of the second reactor 140. The second fluid-solid separation unit 148 may be configured to separate the solid particles of the first used cracking catalyst 146 from the second reactor effluent 144, which is in a fluid phase (generally a vapor phase) the reaction conditions of the first reactor). In FIG. 1, the second fluid-solid separation unit 148 is depicted as a vessel disposed at the outlet end of the second reactor 140, where the vessel changes the fluid velocity in a manner that allows the solid particles to separate and settle out from the fluid phase. The solid particles of the first used cracking catalyst 146 may settle in the bottom of the second fluid-solid separation unit 148, and the second reactor effluent 144 passes out of a top portion of the second fluid-solid separation unit 148. In embodiments, the second fluid-solid separation unit 148 may further include one or more downstream cyclones, filters, or other unit operation (not shown) that may be configured to remove catalyst fines from the second reactor effluent 144. Other types of fluid-solid separation devices, either existing or developed in the future, are contemplated for the second fluid-solid separation unit 148.

The first used cracking catalyst 146 may be passed to the cracking catalyst regenerator 180 and regenerated to produce a regenerated cracking catalyst 182. A first portion of the regenerated cracking catalyst 182 may be passed back to the second reactor 140 as at least a portion of or all of the cracking catalyst 142. In embodiments, a second portion of the regenerated cracking catalyst 182 may be passed from the cracking catalyst regenerator 180 to the inlet end of the first reactor 110 to become at least a portion of the mixed catalyst in the first reactor 110. Regeneration of the used cracking catalyst 146 in the cracking catalyst regenerator 180 to produce the regenerated cracking catalyst 182 will be described in further detail in the present disclosure.

Referring again to FIG. 1, as previously discussed, the systems 100 of the present disclosure include the catalyst separator 160, the decontamination catalyst regenerator 170, and the cracking catalyst regenerator 180, which is separate from the decontamination catalyst regenerator 170. The catalyst separator 160 separates the used mixed catalyst 116 into the used decontamination catalyst 162 and the second used cracking catalyst 164, which enables the use of the mixed catalyst in the first reactor 110. Further, the separate decontamination catalyst regenerator 170 and cracking catalyst regenerator 180 may ensure that the decontamination catalyst and cracking catalyst are maintained separate from one another during regeneration. This may enable proper handling of halogen compounds, such as but not limited to $Cl_2$, HCl, or other halogen compounds released during regeneration of the used decontamination catalyst 162. The separate regenerators may also reduce or prevent degradation of the catalytic activity of the cracking catalyst caused by contact of the cracking catalyst with halogen compounds, such as but not limited to $Cl_2$, produced during regeneration of the used decontamination catalyst 162. Contact with $Cl_2$, HCl, or other halogen compounds in the presence of water vapor (also produced during regeneration of the used decontamination catalyst), can cause dealumination of the cracking catalyst, leading to reduction in the catalytic activity of the cracking catalysts for catalyzing cracking reactions. The separate regenerators may also enable regeneration conditions to be tailored to each of the used decontamination catalyst 162 and used cracking catalyst (first used cracking catalyst 146 and second used cracking catalyst 164), which can enhance effectiveness of the regeneration for each of the two different catalysts. Use of regenerable catalyst for the decontamination catalyst and the cracking catalyst may also reduce the costs involved with treatment, landfill, or disposal of deactivated catalysts, which are associated with the use of non-regenerable catalysts.

The catalyst separator 160 may be in fluid communication with the first fluid-solid separation unit 118 to pass the used mixed catalyst 116 directly from the first fluid-solid separation unit 118 to the catalyst separator 160. The catalyst separator 160 may be configured to separate the used mixed catalyst 116 by difference in density into the used decontamination catalyst 162 and the second used cracking catalyst 164. The catalyst separator 160 may be a gravity-based separation device that allows the two different types of catalyst to settle out according to density so that the denser catalyst particles settle at the bottom and the less dense catalyst particles settle closer to the top of the catalyst separator 160. The used decontamination catalyst 162 may have a density that is greater than the density of the second used cracking catalyst 164. For instance, in embodiments, the decontamination catalyst may have a density of from greater than 1.0 grams per cubic centimeter ($g/cm^3$) to 3.5 $g/cm^3$, and the cracking catalyst may have a density of from 0.6 $g/cm^3$ to 1.0 $g/cm^3$. The difference in density enables the catalyst separator 160 to separate the used mixed catalyst 116 into the used decontamination catalyst 162 and the second used cracking catalyst 164. The catalyst separator 160 may be in fluid communication with the decontamination catalyst regenerator 170 to pass the used decontamination catalyst 162 to the decontamination catalyst regenerator 170. The catalyst separator 160 may also be in fluid communication with the cracking catalyst regenerator 180 to pass the second used cracking catalyst 164 to the cracking catalyst regenerator 180

Referring again to FIG. 1, the used decontamination catalyst 162 may be passed to the decontamination catalyst regenerator 170 and regenerated to produce a regenerated decontamination catalyst 172. The regenerated decontamination catalyst 172 may be passed back to the first reactor 110 as at least a portion of or all of the decontamination catalyst 112 portion of the mixed catalyst. The decontamination catalyst regenerator 170 may be disposed downstream of the catalyst separator 160 and in fluid communication with an outlet of the catalyst separator 160 to pass the used decontamination catalyst 162 from the catalyst separator 160 directly to the decontamination catalyst regenerator 170. During the reactions in the first reactor 110, halogen-containing compounds in the plastic derived oil 102 react with the decontamination catalyst 112 of the mixed catalyst to convert the halogen-containing compounds to hydrogen halides, which are then adsorbed onto the surface of the decontamination catalyst 112. As previously discussed, the decontamination catalyst 112 is primarily made up of metal oxides. As a result, adsorption of the hydrogen halides onto the decontamination catalyst forms metal halides at the surfaces of the used decontamination catalyst 162. For decontamination catalysts that comprise MgO and CaO, adsorption of the HCl onto the decontamination catalysts to form metal halides is illustrated chemical reactions 1 and 2 (RXN 1 and RXN 2), respectively.

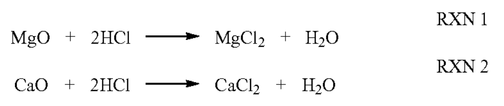

$$MgO + 2HCl \longrightarrow MgCl_2 + H_2O \quad \text{RXN 1}$$

$$CaO + 2HCl \longrightarrow CaCl_2 + H_2O \quad \text{RXN 2}$$

The chemical reactions of HCl with MgO and CaO are provided for purposes of illustration, but are not intended to limit the composition of the decontamination catalyst in any way. Depending on the metal oxides present in the used decontamination catalyst 162, the resulting metal halides adsorbed onto the catalyst surfaces can have different thermal stability.

The decontamination catalyst regenerator 170 may be configured to heat the used decontamination catalyst 162 to a temperature sufficient to desorb the halogens from the used decontamination catalyst 162 to produce halogen compounds and the regenerated decontamination catalyst 172. Halogen compounds may include halogen gases (such as chlorine gas ($Cl_2$)), halogen halides (such as HCl), or combinations of these. The decontamination catalyst regenerator 170 may be configured to contact the used decontamination catalyst 162 with a regeneration gas 174, such as a gas containing oxygen, at a regeneration temperature sufficient to convert the metal halides to halogen compounds. The reactions for $MgCl_2$ and $CaCl_2$) with oxygen gas to produce chlorine gas and MgO and CaO are provided in chemical reactions 3 and 4 (RXN 3 and RXN 4), respectively.

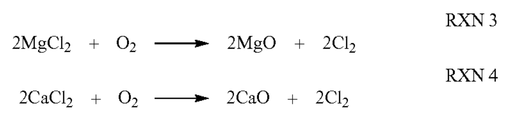

$$2MgCl_2 + O_2 \longrightarrow 2MgO + 2Cl_2 \quad \text{RXN 3}$$

$$2CaCl_2 + O_2 \longrightarrow 2CaO + 2Cl_2 \quad \text{RXN 4}$$

Without being bound by and particular theory, it is believed that the increased temperature in the decontamination catalyst regenerator 170 and contact with the regeneration gas 174 may cause the metal halides at the surface of the used decontamination catalyst 162 to become unstable, leading to conversion of the metal halides back to halogen gases, hydrogen halides, or other halogen compounds and removal of the halogen compounds from the surfaces of the used decontamination catalyst 162 to produce the regenerated decontamination catalyst 172. In embodiments, the regeneration temperature in the decontamination catalyst regenerator 170 may be greater than the operating temperature of the first reactor 110. In embodiments, the regeneration temperature in the decontamination catalyst regenerator 170 may be from 400° C. to 700° C., such as from 400° C. to 600° C., from 400° C. to 550° C., from 450° C. to 600° C., from 450° C. to 550° C., or from 500° C. to 600° C. The regeneration gas 174 may be an oxygen-containing gas, such as but not limited to air. The regeneration gas 174 may also carry the halogen compounds formed during regeneration away from the decontamination catalyst particles.

The removal of the halogens, such as but not limited to chlorine, from the used decontamination catalyst 162 produces the regenerated decontamination catalyst 172. The regenerated decontamination catalyst 172 may have a concentration of halogens less than the concentration of halogens in the used decontamination catalyst 162. The halogen compounds removed from the used decontamination catalyst 162 may be passed out of the decontamination catalyst regenerator 170 in the flue gas 176. The flue gas 176 may exit from a top portion of the decontamination catalyst regenerator 170. The flue gas 176 comprising the halogen compounds (e.g., $Cl_2$, HCl, or other halogen containing compounds) may be passed to one or more downstream treatment systems for properly handling of the halogen compounds to reduce environmental impact, such as through acid gas removal systems, scrubbing, and the like.

The regenerated decontamination catalyst 172 may have a concentration of halogens of less than or equal to 1 part per million by weight (ppwm). Referring again to FIG. 1, the decontamination catalyst regenerator 170 may be in fluid communication with the inlet end of the first reactor 110 to pass the regenerated decontamination catalyst 172 back to the first reactor 110 as at least a portion of or all of the decontamination catalyst 112. The system 100 may further include a regenerated decontamination catalyst transfer line 173 fluidly coupling the decontamination catalyst regenerator 170 and the inlet of the first reactor 110. The regenerated decontamination catalyst transfer line 173 may be operable to pass the regenerated decontamination catalyst 172 from the decontamination catalyst regenerator 170 to the first reactor 110. In embodiments, the system 100 may further include a decontamination catalyst valve 175 disposed in the regenerated decontamination catalyst transfer line 173 and operable to control a mass flow rate of the regenerated decontamination catalyst 172 from the decontamination catalyst regenerator 170 to the first reactor 110.

Referring again to FIG. 1, the system 100 comprises the cracking catalyst regenerator 180 disposed downstream of the second fluid-solid separation unit 148. The cracking catalyst regenerator 180 may be in fluid communication with an outlet of the second fluid-solid separation unit 148 to pass the first used cracking catalyst 146 from the second fluid-solid separation unit 148 to the cracking catalyst regenerator 180. The cracking catalyst regenerator 180 may also be disposed downstream of the catalyst separator 160. The cracking catalyst regenerator 180 may be in fluid communication with an outlet of the catalyst separator 160 to pass the second used cracking catalyst 164 from the catalyst separator 160 to the cracking catalyst regenerator 180. The first used cracking catalyst 146 and the second used cracking catalyst 164 may be combined upstream of the cracking catalyst regenerator 180 or may be passed separately to the cracking catalyst regenerator 180 and combined within the cracking catalyst regenerator 180.

During the cracking reactions in the second reactor 140 and to some extent in the first reactor 110, coke may deposit on the cracking catalyst, which may block reactive sites on the cracking catalyst and reduce the catalytic activity of the cracking catalyst for catalyzing the cracking reactions. The cracking catalyst regenerator 180 may be configured to heat the first used cracking catalyst 146 and the second used cracking catalyst 164 to a regeneration temperature sufficient to combust the coke deposits, increase the temperature of the catalyst particles, or both to produce the regenerated cracking catalyst 182.

In embodiments, the cracking catalyst regenerator 180 may be configured to contact the first used cracking catalyst 146 and the second used cracking catalyst 164 with a regeneration gas 184 at the regeneration temperature, which may be sufficient to combust coke deposits on the used cracking catalyst, increase the temperature of the cracking catalyst, or both. The regeneration gas 184 may be an oxygen-containing gas, such as but not limited to air. In embodiments, the regeneration gas 184 may include a fuel gas in addition to the oxygen-containing gas. The fuel gas may be added to increase the heat produced in the cracking catalyst regenerator 180, which can increase combustion of coke deposits, further increase the temperature of the cracking catalyst, or both.

In embodiments, the cracking catalyst regenerator 180 may be configured to contact the first used cracking catalyst 146 and second used cracking catalyst 164 with the regeneration gas 184 at a regeneration temperature that is greater than the operating temperature of the second reactor 140, such as at a regeneration temperature of from 500° C. to 800° C., from 500° C. to 750° C., from 500° C. to 700° C., from 550° C. to 800° C., from 550° C. to 750° C., from 550° C. to 700° C., from 600° C. to 800° C., from 600° C. to 750° C., from 600° C. to 700° C., or from 650° C. to 800° C. The cracking catalyst regenerator 180 may have a flue gas outlet for passing a flue gas 186 out of the cracking catalyst regenerator 180. The flue gas 186 may include unreacted regeneration gases and combustion gases produced from combustion of the coke deposits and any fuel gases added to the cracking catalyst regenerator 180.

The cracking catalyst regenerator 180 may be in fluid communication with the inlet of the second reactor 140 to pass at first portion of the regenerated cracking catalyst 182 back to the second reactor 140 as at least a portion of or all of the cracking catalyst 142. In embodiments, the first portion of the regenerated cracking catalyst 182 may be passed to a catalyst hopper (not shown) upstream of the second reactor 140. The catalyst hopper may enable the temperature of the regenerated cracking catalyst 182 to stabilize prior to introducing the regenerated cracking catalyst 182 back to the second reactor 140. In embodiments, the system 100 may comprise a first regenerated cracking catalyst transfer line 188 fluidly coupling the cracking catalyst regenerator 180 to the inlet end of the second reactor 140. The first regenerated cracking catalyst transfer line 188 may be operable to transfer the first portion of the regenerated cracking catalyst 182 to the second reactor 140 or the hopper upstream of the second reactor 140.

The cracking catalyst regenerator 180 may also be in fluid communication with the inlet of the first reactor 110 to pass a second portion of the regenerated cracking catalyst 182 to the inlet of the first reactor 110. In embodiments, the second portion of the regenerated cracking catalyst 182 may be passed to a catalyst hopper (not shown) upstream of the first reactor 110. In embodiments, the system 100 may comprise a second regenerated cracking catalyst transfer line 189 fluidly coupling the cracking catalyst regenerator 180 to the inlet end of the first reactor 110. The second regenerated cracking catalyst transfer line 189 may be operable to transfer the second portion of the regenerated cracking catalyst 182 to the inlet end of the first reactor 110 or to the hopper upstream of the first reactor 110. In embodiments, the system 100 may further include a cracking catalyst valve 185 disposed in the second regenerated cracking catalyst transfer line 189 and operable to control a mass flow rate of the regenerated cracking catalyst 182 from the cracking catalyst regenerator 180 to the first reactor 110.

As previously discussed, the catalyst weight ratio in the mixed catalyst can be modified depending on the properties of the plastic derived oil 102, such as the concentration of halogen-containing compounds in the plastic derived oil 102, the concentration of heavy compounds in the plastic derived oil 102, or combinations of these properties. The catalyst weight ratio in the mixed catalyst used in the first reactor 110 can be modified by manipulating the decontamination catalyst valve 175, the cracking catalyst valve 185, or both to change the proportion of the regenerated decontamination catalyst 172 and regenerated cracking catalyst 182 passed to the first reactor 110.

In embodiments, the regenerated decontamination catalyst 172 and the second portion of the regenerated cracking catalyst 182 may be passed to a catalyst hopper (not shown) disposed upstream of the first reactor 110. The catalyst hopper may enable combining of the regenerated decontamination catalyst 172 and second portion of the regenerated cracking catalyst 182 to produce the mixed catalyst and may enable the temperature of the regenerated decontamination catalyst 172 and second portion of the regenerated cracking catalyst 182 to stabilize prior to introducing the mixed catalyst to the first reactor 110. The catalyst hopper may be disposed downstream of the decontamination catalyst valve 175 and the cracking catalyst valve 185.

Referring again to FIG. 1, the second reactor effluent 144 may be passed out of the second reactor 140, such as out of the second fluid-solid separation unit 148. The second reactor effluent 144 may comprise a greater concentration of light olefins, light aromatic compounds, naphtha range hydrocarbons, or combinations of these constituents compared to the heavy stream 134. The second reactor effluent 144 may be passed to the product separation system 150. The light effluent 132 may also be passed from the first effluent separation system 130 to the product separation system 150. The second reactor effluent 144 and the light effluent 132 may be combined upstream of the product separation system 150 or may be passed separately to the product separation system 150 and combined within the product separation system 150. In embodiments, the light effluent 132 may be passed directly from the first reactor effluent separation system 130 to the product separation system 150, and the second reactor effluent 144 may be passed directly from the second fluid-solid separator 148 to the product separation system 150.

In embodiments, the combination of the second reactor effluent 144 and the light effluent 132 may comprise at least 50 wt. % light olefins and naphtha range hydrocarbons based on the total combined weight of the second reactor effluent 144 and light effluent 132. For purposes of the present disclosure, the terms "naphtha range hydrocarbons" and "naphtha" refer to hydrocarbons having boiling point temperatures of from 25° C. to 221° C., the term "middle distillate" refers to hydrocarbons having boiling point temperatures of from 221° C. to 343° C., and the term "heavy distillate" refers to hydrocarbons having boiling point temperatures greater than 343° C. In embodiments, the combination of the second reactor effluent 144 and the light effluent 132 may comprise at least 55 wt. %, at least 60 wt. %, at least 65 wt. %, at least 70 wt. %, or at least 75 wt. % of light olefins and naphtha range hydrocarbons based on the total combined weight of the second reactor effluent 144 and light effluent 132. In embodiments, the combination of the second reactor effluent 144 and the light effluent 132 may comprise at least 20 wt. %, at least 25 wt. %, at least 30 wt. %, at least 32 wt. %, at least 34 wt. %, or at least 36 wt. % light olefins based on the total combined weight of the second reactor effluent 144 and light effluent 132. Additionally, in embodiments, the combination of the second reactor effluent 144 and the light effluent 132 may comprise at least 30 wt. %, at least 35 wt. %, at least 40 wt. %, or at least 42 wt. % of naphtha range hydrocarbons based on the total combined weight of the second reactor effluent 144 and light effluent 132. In embodiments, the combination of the second reactor effluent 144 and the light effluent 132 may comprise less than 20 wt. %, less than 18 wt. %, less than 16 wt. %, less than 10 wt. %, or even less than 5 wt. % of middle distillates and heavy distillates based on the total combined weight of the second reactor effluent 144 and light effluent 132.

The combination of the second reactor effluent 144 and the light effluent 132 may be separated in the product separation system 150 to produce at least one product stream. The product separation system 150 may be disposed downstream of the second reactor 140 and downstream of the first reactor effluent separation system 130. The product separation system 150 can include one or a plurality of separation units, which, collectively, operate to separate the second reactor effluent 144 and the light effluent 132 into the plurality of product streams. In embodiments, the product separation system 150 may include one or more fractionation units. Other types of separation units are contemplated, such as but not limited to extraction units, distillation units, crystallization units, or other units. The product separation system 150 may be in fluid communication with the second reactor 140 and the first reactor effluent separation system 130 to pass the second reactor effluent 144 and the light stream 132 directly to the product separation system 150.

The plurality of product streams can include one or more light olefin streams 152 comprising olefin compounds having from 2-4 carbon atoms. The light olefin streams 152 may include an ethylene stream, a propylene stream, a mixed butenes stream, or combinations of these. The plurality of product streams can include a naphtha stream (not shown) comprising constituents having boiling point temperatures of from 25° C. to 221° C. The naphtha stream may contain light aromatic compounds and gasoline components. In embodiments, the product separation system 150 may be operable to further separate the naphtha stream to produce a light aromatics stream 154 and a gasoline stream 156. The light aromatics stream 154 may include aromatic compounds having from 6 to 8 carbon atoms, such as benzene, toluene, xylenes, and/or ethylbenzene, which may be used as chemical intermediates for producing circular polymer materials (polymers made from recovered hydrocarbons instead of hydrocarbons produced from subterranean sources and therefore having a lower environmental footprint). The gasoline stream 156 may include other hydrocarbon compounds suitable for use as fuel blending components. The gasoline stream 156 comprises low carbon footprint fuel components, where the low carbon footprint comes from producing the fuel components from recovered hydrocarbons instead of from hydrocarbons produced from subterranean sources. In embodiments, the product separation system 150 may include an aromatics recovery complex operable to separate the naphtha stream into the light aromatic stream 154 and the gasoline stream 156.

The plurality of product streams from the product separation system 150 may further include a bottom stream 158 comprising middle distillates and heavy distillates, such as hydrocarbon compounds having boiling point temperatures greater than 221° C. In embodiments, the bottom stream 158 may be further separated into middle distillates and heavy distillates. In embodiments, the product separation system 150 further may be operable to produce a light gas stream (not shown) comprising light gases such as but not limited to hydrogen, methane, or both produced in the first reactor 110, the second reactor 140, or both. In embodiments, the product separation system 150 may be further operable to produce a light paraffin stream comprising saturated hydrocarbons having from 2 to 4 carbon atoms (ethane, propane, butane, and isobutane). Other product streams may be produced by the product separation system 150.

Figure 3:
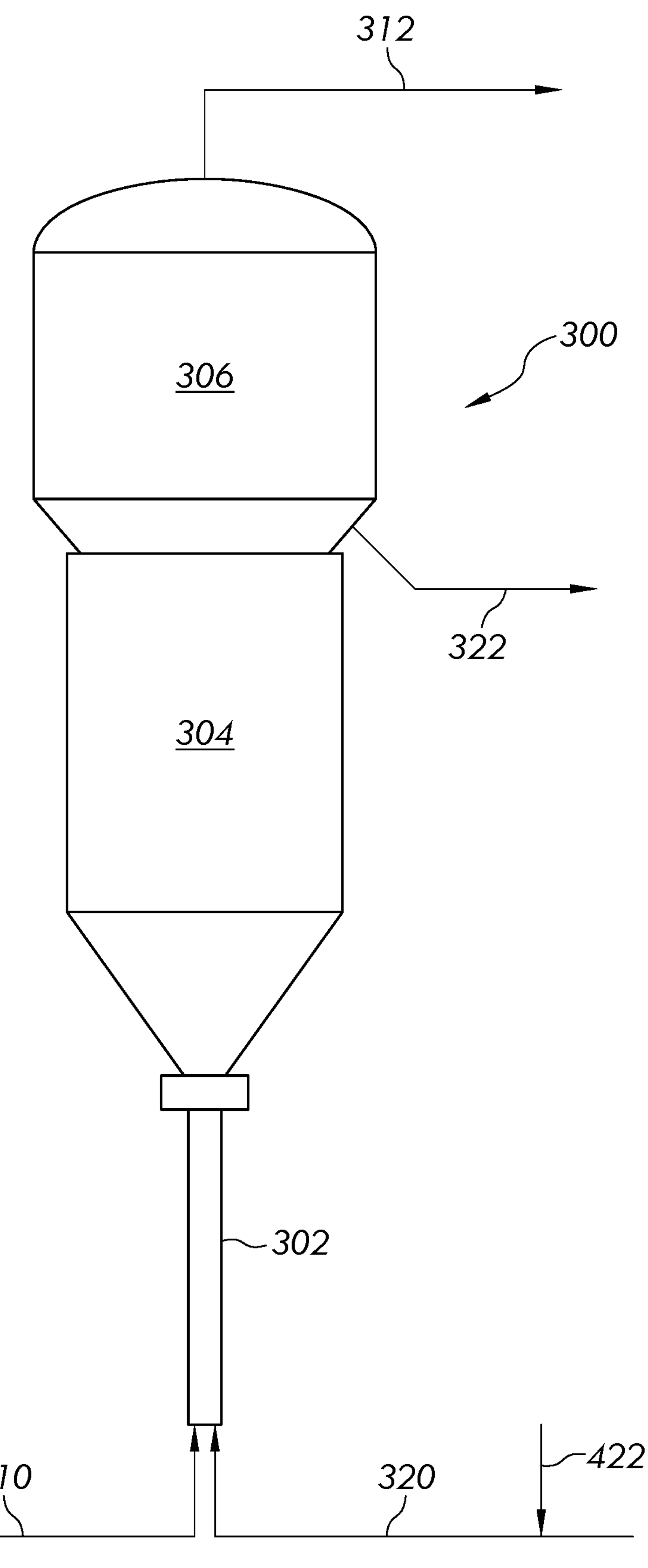
FIG. 3 schematically depicts a generalized flow diagram of a riser fluidized bed reactor system, according to embodiments shown and described in this disclosure.

As discussed, in embodiments, the first reactor 110 and the second reactor 140 may be each be a fluidized bed reactor. Referring now to FIG. 3, one embodiment of a fluidized bed reactor 300 that comprises a riser reactor (upflow reactor) is schematically depicted. In a riser reactor, the catalyst and reactants flow co-currently in an upward direction through the reaction zone. Although described in the context of riser reactors, it is understood that the first reactor 110, the second reactor 140, or both may be a downer (downflow) fluidized bed reactor. In a downer or downflow fluidized bed reactor, the catalyst and reactants flow co-currently in the downward direction. Upward and downward are relative to the direction of the force of gravity.

The fluidized bed reactor 300 can include a riser 302, a reaction zone 304 downstream of the riser 302, and a separation zone 306 downstream of the reaction zone 304. The separation zone 304 in FIG. 3 corresponds to the first fluid-solid separator 118 and second fluid-solid separator 148 in FIGS. 1 and 2. In operation of the fluidized bed reactor 300 of FIG. 3, the hydrocarbon feed 310 is introduced to the riser 302. For the first reactor 110, the hydrocarbon feed 310 would be the plastic derived oil 102, and for the second reactor 140, the hydrocarbon feed 310 would be the heavy stream 134. In embodiments, the hydrocarbon feed 310 may be combined with steam (not shown) upstream of the riser 302. The hydrocarbon feed 310 may be combined with an effective quantity of heated catalyst 320 in the riser 302, where the catalyst 320 may be new catalyst or regenerated catalyst. For the first reactor 110, the catalyst 320 may be the mixed catalyst (decontamination catalyst and cracking catalyst), and for the second reactor 140, the catalyst 320 may be the cracking catalyst 142 (new or regenerated).

The hydrocarbon feed 310 and the catalyst 320 (with optional steam) are contacted in the riser 302 and passed upward through the riser 302 into the reaction zone 304. In the riser 302 and the reaction zone 304, the hydrocarbons from the hydrocarbon feed 310 are contacted with the catalyst 320 at reaction conditions, which may cause at least a portion of the hydrocarbons to undergo one or more chemical reactions to produce a reaction mixture comprising a reactor effluent and the used catalyst. The reaction mixture comprising the used catalyst and reactor effluent may then be passed to the separation zone 306 downstream of the reaction zone 304. In the separation zone 306, the reaction mixture is separated to produce the reactor effluent 312 and the used catalyst 322. The separation zone 306 may include one or a plurality of solid-fluid separation devices, which may have any suitable configuration known in the art. Solid-fluid separation devices may include catalyst deflectors, freeboard zones, cyclones, filters, or other type of solid-fluid separation devices. Referring again to FIGS. 1 and 2, the separation zone for the first reactor 110 may comprise the first fluid-solid separation unit 118, and the separation zone for the second reactor 140 may comprise the second fluid-solid separation unit 148.

During the reactions in the fluidized bed reactor 300, the catalyst 320 may decrease in catalytic activity. For cracking catalysts, the reactions in the fluidized bed reactor 300 may produce coke deposits on the used cracking catalyst, which may block reactive sites on the cracking catalyst. For the decontamination catalyst, the reactions in the fluidized bed reactor may cause adsorption of metal halides on the surface of the used decontamination catalyst. The reactions may also reduce the temperature of the used catalyst 322 compared to the catalyst 320 introduced to the riser. The used catalyst 322 may be passed from the regeneration zone 306 to a catalyst regenerator for regeneration of the used catalyst 322 to produce a regenerated catalyst having greater activity.

Figure 4:
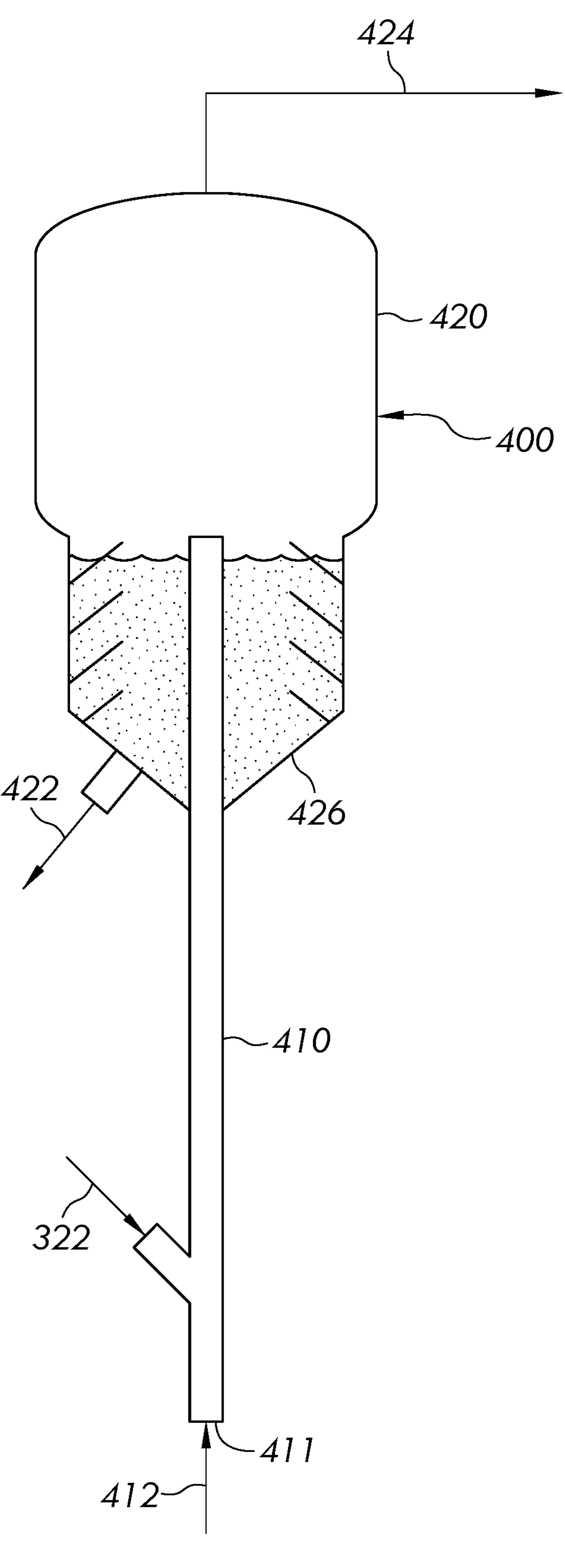
FIG. 4 schematically depicts a generalized flow diagram of a riser catalyst regenerator, according to embodiments shown and described in this disclosure.
Figure 5:
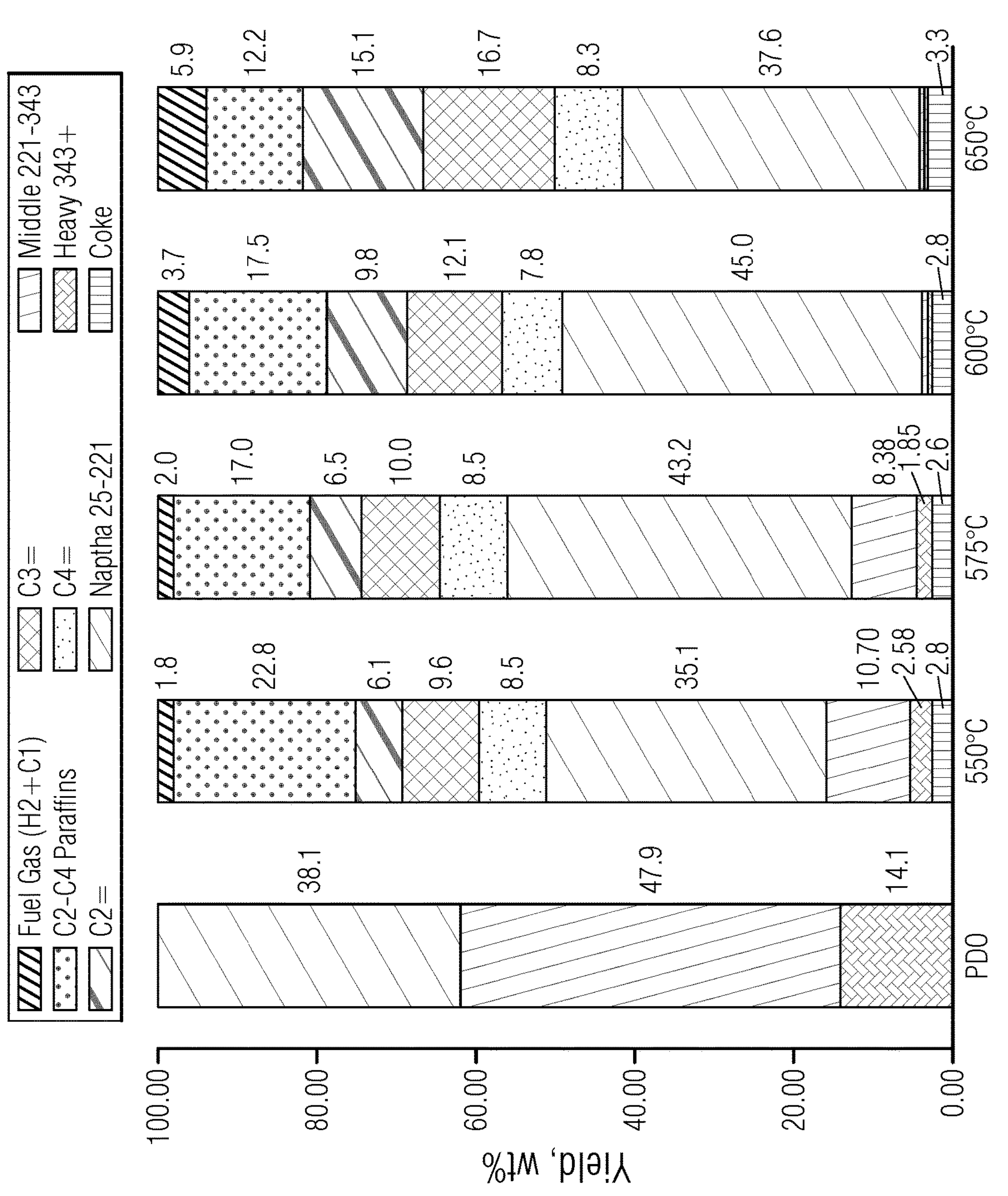
FIG. 5 graphically depicts the composition of the plastic derived oil and reaction effluents from fluidized catalytically cracking the plastic derived oil at various cracking temperatures, according to embodiments shown and described in this disclosure.

Referring now to FIG. 4, one embodiment of a catalyst regenerator 400 for a fluidized bed reactor 300 is schematically depicted. The catalyst regenerator 400 may be a riser catalyst regenerator comprising a riser 410 and a separation zone 420 disposed at the outlet end of the riser 410. During operation of the catalyst regenerator 400, the used catalyst 322 may be passed to the inlet 411 of the riser 410. A regeneration gas 412 may also be introduced to the inlet 411 of the riser 410. In embodiments, the regeneration gas 412 may be an oxygen-containing gas, such as air, compressed oxygen, or other oxygen-containing gas. In embodiments, the regeneration gas 412 may also include a fuel gas in addition to the oxygen-containing gas. The regeneration gas 412 and used catalyst 322 may be contacted at regeneration conditions, which may cause reaction between the used catalyst 322 and the regeneration gas 412. In embodiments, the regeneration gas 412 is the oxygen-containing gas and the reaction may include combustion of coke deposits, fuel gas, or both, which may cause removal of at least a portion of the coke deposits from the used catalyst, increase the temperature of the used catalyst, or both to produce the regenerated catalyst 422. The regenerated catalyst 422 may have reduced coke deposits, greater temperature, or both compared to the used catalyst 322.

The regenerated catalyst 422 may be separated from combustion gases in the catalyst separation zone 420 disposed at the outlet end of the riser 410. The combustion gases may be removed from the catalyst regenerator 400 as a flue gas 424. The flue gas 424 may include unreacted regeneration gases 412 as well as combustion gases, which may be the reaction products produced through combustion of coke deposits and/or fuel gas in the riser 410. In the case of the decontamination catalyst regenerator (FIG. 1), the flue gas 424 may include halogen compounds extracted from the catalyst particles, such as but not limited to hydrogen halides, halogen gases, or other halogen-containing compounds. The regenerated catalyst 422 may be passed back to the fluidized bed reactor 300 as at least a portion of the catalyst 320. Although depicted in FIG. 3 as a riser-type catalyst regenerator, is it understood that other configurations for the catalyst regenerator 400 may be employed, such as but not limited to downer regenerators, fixed bed catalyst regenerators, or other type of regenerator.

Referring again to FIG. 1, the system 100 can be used in a process for upgrading plastic derived oil. The process for upgrading the plastic derived oil may include contacting the plastic derived oil stream 102 with the mixed catalyst in the first reactor 110 at reaction conditions. The first reactor 110 may be a fluidized bed reactor. The mixed catalyst may include a mixture of the decontamination catalyst 112 and the cracking catalyst 142, where the cracking catalyst is different from the decontamination catalyst. Contact of the plastic derived oil stream 102 with the mixed catalyst at reaction conditions produces a first reactor effluent 114 having reduced concentrations of halogen-containing compounds compared to the plastic derived oil stream 102. The first reactor 110 may have any of the configurations, catalysts, operating conditions, or other features described in the present disclosure for the first reactor 110. The decontamination catalyst 112 of the mixed catalyst may react with organic halide compounds to produce hydrogen halides, and the hydrogen halides may then be adsorbed by the decontamination catalyst 112. Additionally, the cracking catalyst in the mixed catalyst may contact heavy hydrocarbon molecules in the plastic derived oil stream 102 and crack some of the heavy hydrocarbon molecules, which may improve access to the halogen-containing compounds by the decontamination catalyst.

The processes may further include separating the first reactor effluent 114 from the used mixed catalyst 116 downstream of the first reactor 110. Separating the first reactor effluent 114 from the used mixed catalyst 116 may be accomplished by the first fluid-solid separation unit 118 disposed at the outlet end of the first reactor 110. The processes may include passing the contents of the first reactor 110 to the first fluid-solid separation unit 118 that separates the first reactor effluent 114 from the used mixed catalyst 116.

The processes may include passing at least a portion of the first reactor effluent 114 to the second reactor 140 disposed downstream of the first reactor 110. The processes may include contacting at least a portion of or all of the first reactor effluent 114 with the cracking catalyst 142 at reaction conditions in the second reactor 140. The second reactor 140 may have any of the configurations, cracking catalysts, operating conditions, or other features described in the present disclosure for the second reactor 140. The second reactor 140 may be a fluidized bed reactor. The cracking catalyst 142 is different from the decontamination catalyst 112 and can be any of the cracking catalysts discussed in the present disclosure. Contacting all or a portion of the first reactor effluent 114 with the cracking catalyst 142 in the second reactor 140 may cause catalytic cracking of the portion of the first reactor effluent 114 to produce the second reactor effluent 144. The second reactor effluent 144 may comprise light olefins, naphtha range hydrocarbons, or combinations of these. The second reactor effluent 144 may have a greater concentration of light olefins, such as but not limited to ethylene, propylene, or both; light aromatic compounds; naphtha range hydrocarbons; gasoline constituents; or combinations thereof compared the portion of the first reactor effluent 114 introduced to the second reactor 140.

The processes may further include separating the second reactor effluent 144 from the used cracking catalyst 146 downstream of the second reactor 140 to produce a first used cracking catalyst 146. Separating the second reactor effluent 144 from the used cracking catalyst 146 may be accomplished by the second fluid-solid separation unit 148 disposed at the outlet end of the second reactor 140. The processes may include passing the contents of the second reactor 140 to the second fluid-solid separation unit 148 that separates the second reactor effluent 144 from the used cracking catalyst 146.

Referring again to FIGS. 1 and 2, as previously discussed, the system may include the catalyst separator 160, the decontamination catalyst regenerator 170, and the cracking catalyst regenerator 180 that is separate and apart from the decontamination catalyst regenerator 170. The processes of the present disclosure may include passing the used mixed catalyst 116 to the catalyst separator 160. The processes may include separating the used mixed catalyst 116 to produce the used decontamination catalyst 162 and the second used cracking catalyst 164. Separating the used mixed catalyst 116 may include separating the used mixed catalyst 116 by density into the used decontamination catalyst 162 and the second used cracking catalyst 164. In embodiments, the decontamination catalyst may have a density of from 1.0 $g/cm^3$ to 3.5 $g/cm^3$, and the cracking catalyst may have a density of from 0.6 $g/cm^3$ to 1.0 $g/cm^3$.

The processes of the present disclosure may include passing the used decontamination catalyst 162 to the decontamination catalyst regenerator 170, and regenerating the used decontamination catalyst 162 in the decontamination catalyst regenerator 170 to produce the regenerated decontamination catalyst 172. The regenerated decontamination catalyst 172 may have a reduced concentration of halogens compared to the used decontamination catalyst 162. The regenerated decontamination catalyst 172 may also have a temperature greater than the used decontamination catalyst 162 prior to regeneration. In embodiments, regenerating the used decontamination catalyst 162 may include contacting the used decontamination catalyst 162 with the regeneration gas 174 at a regeneration temperature sufficient to convert metal halides at the surface of the used decontamination catalyst 162 to halogen compounds, such as but not limited to $Cl_2$ and other halogen gases. In embodiments, the regeneration gas 174 may be an oxygen-containing gas, such as but not limited to air. In embodiments, the used decontamination catalyst 162 may be contacted with the regeneration gas 174 in the decontamination catalyst regenerator 170 at the regeneration temperature that is greater than the operating temperature of the first reactor 110, such as at a regeneration temperature of from 400° C. to 700° C., from 400° C. to 600° C., from 400° C. to 550° C., from 400° C. to 500° C., from 450° C. to 700° C., from 450° C. to 600° C., from 450° C. to 550° C., from 450° C. to 500° C., from 500° C. to 700° C., from 500° C. to 600° C., from 500° C. to 550° C., from 550° C. to 700° C., or from 550° C. to 600° C. The processes may further include passing a flue gas 176 out of the decontamination catalyst regenerator 170, wherein the flue gas 176 comprises halogen compounds, such as but not limited to $Cl_2$ or HCl. The processes may include passing the flue gas 176 to a downstream treatment system for properly handling the hydrogen halides in the flue gas 176.

The processes of the present disclosure may include passing the first used cracking catalyst 146 and the second used cracking catalyst 164 to the cracking catalyst regenerator 180, and regenerating the first used cracking catalyst 146 and second used cracking catalyst 164 in the cracking catalyst regenerator 180 to produce the regenerated cracking catalyst 182. Regenerating the used cracking catalyst (the first used cracking catalyst 146 and the second used cracking catalyst 164) in the cracking catalyst regenerator 180 separate and apart from the decontamination catalyst regenerator 170 may reduce exposure of the cracking catalyst to halogen-containing compounds, such as hydrogen halides or halogen gases, produced during regeneration of the used decontamination catalyst 162.

The regenerated cracking catalyst 182 may have reduced coke deposits, greater temperature, or both compared to the first used cracking catalyst 146, the second used cracking catalyst 164, or both. In embodiments, regenerating the first used cracking catalyst 146 and the second used cracking catalyst 164 may include contacting the first used cracking catalyst 146 and second used cracking catalyst 164 with the regeneration gas 184 at a regeneration temperature sufficient to cause combustion of coke deposits on the surface of the used cracking catalyst, increase the temperature of the regenerated cracking catalyst 182, or both. In embodiments, the regeneration gas 184 may be an oxygen-containing gas, such as but not limited to air. In embodiments, the regeneration gas 184 for the cracking catalyst regenerator 180 may also include a fuel gas. Combustion of the fuel gas may increase the heat generated in the cracking catalyst regenerator 180, thereby increasing the regeneration temperature in the cracking catalyst regenerator 180.

In embodiments, the first used cracking catalyst 146 and the second used cracking catalyst 164 may be contacted with the regeneration gas 184 in the cracking catalyst regenerator 180 at the regeneration temperature that is greater than the operating temperature of the second reactor 140, such as at a regeneration temperature of from 500° C. to 800° C., from 500° C. to 750° C., from 500° C. to 700° C., from 550° C. to 800° C., from 550° C. to 750° C., from 550° C. to 700° C., from 600° C. to 800° C., from 600° C. to 750° C., from 600° C. to 700° C., or from 650° C. to 800° C. The processes may further include passing a flue gas 186 out of the cracking catalyst regenerator 180. The flue gas 186 may include unreacted regeneration gases and combustion gases produced from combustion of the coke deposits and any fuel gases added to the cracking catalyst regenerator 180. The processes may include passing the flue gas 186 to a downstream treatment system for treatment of combustion gases.

The processes may further include passing the regenerated decontamination catalyst 172 back to the first reactor 110 as at least a portion of or all of the decontamination catalyst 112 in the mixed catalyst. The processes may further include passing a first portion of the regenerated cracking catalyst 182 back to the second reactor 140 as at least a portion of or all of the cracking catalyst 142. The processes may further include passing a second portion of the regenerated cracking catalyst 182 to the inlet end of the first reactor 110 as at least a portion of the mixed catalyst. The processes may include combining the regenerated decontamination catalyst 172 and the second portion of the regenerated cracking catalyst 182 upstream of the first reactor 110. In embodiments, the regenerated decontamination catalyst 172 and the second portion of the regenerated cracking catalyst 182 may be passed separately to the inlet end of the first reactor 110 and mixed within the first reactor 110.

Referring again to FIG. 2, the first reactor 110 may be a fluidized bed reactor, such as a riser reactor. The plastic derived oil stream 102, or portion thereof, and the mixed catalyst comprising the decontamination catalyst 112 and the cracking catalyst 142 may be introduced to an inlet of the riser of the first reactor 110. In embodiments, the catalyst weight ratio of the mixed catalyst is from greater than 0 to 1, or from 0.1 to 1, where the catalyst weight ratio is equal to the mass of cracking catalyst divided by the mass of the decontamination catalyst. The plastic derived oil stream 102 and the mixed catalyst may be contacted in the riser and may travel together through the riser and reaction zone of the first reactor 110. The plastic derived oil stream 102 and the mixed catalyst may be contacted in the first reactor 110 at a temperature of from 300° C. to 450° C., such as from 300° C. to 425° C. from 300° C. to 400° C., from 325° C. to 450° C., from 325° C. to 425° C., from 325° C. to 400° C., from 350° C. to 450° C., from 350° C. to 425° C., or from 350° C. to 400° C. The plastic derived oil stream 102 and the mixed catalyst may be contacted in the first reactor 110 at a pressure of from 100 kPa to 1000 kPa, or at about atmospheric pressure (i.e., about 101.3 kPa).

The plastic derived oil stream 102 and the mixed catalyst may be introduced to the first reactor 110 at a catalyst-to-oil weight ratio of greater than or equal to 0.2. The catalyst-to-oil weight ratio in the first reactor 110 is equal to a mass flow rate of the mixed catalyst divided by a mass flow rate of the plastic derived oil stream 102 in the first reactor 110 averaged over time at steady state. In embodiments, catalyst-to-oil weight ratio in the first reactor 110 may be from 0.2 to 20, such as from 0.2 to 10, from 0.2 to 5, from 0.5 to 20, from 0.5 to 10, from 0.5 to 5, from 1 to 20, from 1 to 10, from 1 to 5, from 2 to 20, from 2 to 10, from 2 to 5, from 5 to 20, or from 5 to 10. In embodiments, the first reactor effluent 114 may comprise less than 100 ppmw halogen-containing compounds based on the total weight of the first reactor effluent 114.

The catalyst-to-oil weight ratio in the first reactor 110 may be adjusted based on the concentration of halogen-containing compounds in the plastic derived oil stream 102. Specifically, the catalyst-to-oil weight ratio in the first reactor 110 can be increased when the concentration of halogen-containing compounds in the plastic derived oil stream 102 increases and decreased when the concentration of halogen-containing compounds in the plastic derived oil stream 102 decreases. In embodiments, the methods and processes disclosed herein may include adjusting the catalyst-to-oil weight ratio in the first reactor 110 based on the concentration of the halogen-containing compounds in the portion of the plastic derived oil stream 102 passed to the first reactor 110 (plastic derived oil stream 102 or treated plastic derived oil 232). In embodiments, adjusting the weight ratio of catalyst-to-oil in the first reactor 110 may include determining a concentration of the halogen-containing compounds in the plastic derived oil stream 102 and adjusting a mass flow rate of the plastic derived oil stream 102 to the first reactor 110, a mass flow rate of the mixed catalyst to the first reactor 110, or both, to adjust the catalyst-to-oil weight ratio. The weight ratio of catalyst-to-oil may be adjusted in proportion to the concentration of halogen-containing compounds in the plastic derived oil stream 102. Referring again to FIG. 2, the concentration of the halogen-containing compounds in the plastic derived oil stream 102 may be determined using a sensor 190 disposed in the plastic derived oil stream 102. The sensor 190 or a supplemental sensor (not shown) may be positioned to determine the concentration of halogen-containing compounds in the treated plastic derived oil 232. The sensor 190 may be positioned upstream or downstream of the point where the supplemental feed stream 106 is combined with the plastic derived oil stream 102 or the treated plastic derived oil 232.

In embodiments, the processes may include determining a concentration of heavy compounds, a concentration of halogen-containing compounds, or both in the plastic derived oil 102 with the sensor 190 and modifying the catalyst weight ratio of the mixed catalyst based on the concentration of the heavy compounds, the concentration of the halogen-containing compounds, or both in the plastic derived oil 102. Modifying the catalyst weight ratio of the mixed catalyst may include manipulating the decontamination catalyst valve 175, the cracking catalyst valve 185, or both to change the mass flow rate of the regenerated decontamination catalyst 172, the regenerated cracking catalyst 182, or both to the first reactor 110. In embodiments, the sensor 190 may include one or a plurality of sensors configured to measure the concentration of heavy compounds, the concentration of halogen-containing compounds, or both in the plastic derived oil 102.

Referring again to FIG. 2, as previously discussed, the first reactor effluent 114 may be separated from the used mixed catalyst 116 in the first fluid-solid separation unit 118 disposed at the outlet end of the reaction zone of the first reactor 110. The first reactor effluent 114 may be passed from the first fluid-solid separation unit 118 directly to the adsorption unit 120. The first reactor effluent 114 may be treated in the adsorption unit 120 and then separated in the first reactor effluent separation system 130 to produce the light effluent 132 and the heavy stream 134, as previously discussed herein. The heavy stream 134 may be passed to the second reactor 140.

The processes of the present disclosure may include contacting the first reactor effluent 114 with the adsorbents in the adsorption unit 120 disposed downstream of the first reactor 110 to produce the treated first reactor effluent 122. The adsorption unit 120 may have any of the adsorbents or other features discuss in the present disclosure for the adsorption unit 120. The process may further include passing at least a portion of the treated first reactor effluent 122 to the second reactor 140 disposed downstream of the first reactor 110. In embodiments, all of the treated first reactor effluent 122 may be passed to the second reactor 140. In embodiments, the treated first reactor effluent 122 may be separated in the first reactor effluent separation system 130, which may be disposed between the adsorption unit 120 and the second reactor 140, to produce a light effluent 132 and a heavy stream 134. In embodiments, only the heavy stream 134 may be passed onward downstream to the second reactor 140.

Referring again to FIG. 2, the second reactor 140 may be a fluidized bed reactor operable to conduct fluidized catalytic cracking of the portion of the first reactor effluent 114 to produce the second reactor effluent 144 comprising light olefins, light aromatic compounds, or both. In embodiments, the portion of the first reactor effluent 114 may be the heavy stream 134 produced by the first reactor effluent separation system 130. Fluidized catalytic cracking (FCC) is a conversion process used in petroleum refineries and is utilized to convert the high-boiling, high-molecular weight hydrocarbon fractions of petroleum crude oils or other hydrocarbon stream into more valuable gasoline, olefinic gases, and other products. The second reactor 140 may be a riser reactor or a downer reactor.

In embodiments, the second reactor 140 may be a riser reactor. The portion of the first reactor effluent 114, such as the heavy stream 134, and the cracking catalyst 142 may be introduced to an inlet end of the riser of the second reactor 140. The portion of the first reactor effluent 114 and the cracking catalyst 142 may be contacted in the riser reactor at reaction conditions and may travel together through the riser and reaction zone of the second reactor 140. The cracking catalyst 142 may be any of the catalysts previously discussed in the present disclosure as being suitable for the cracking catalyst. In embodiments, portion of the first reactor effluent 114 may be introduced to the second reactor 140 accompanied by steam or other suitable gas for atomization of the feed stream (not shown). The portion of the first reactor effluent 114 may be combined with and intimately contacted with an effective quantity of heated fresh or regenerated solid cracking catalyst particles.

The portion of the first reactor effluent 114, such as the heavy stream 134, and the cracking catalyst 142 may be contacted in the second reactor 140 at a temperature of from 450° C. to 700° C., such as from 450° C. to 675° C., from 450° C. to 650° C., from 450° C. to 600° C., from 500° C. to 700° C., from 500° C. to 675° C., from 500° C. to 650° C., from 500° C. to 600° C., from 550° C. to 700° C., from 550° C. to 675° C., or from 550° C. to 650° C. The portion of the first reactor effluent 114 and the cracking catalyst 142 may be contacted in the second reactor 140 at a pressure of from 100 kPa to 2,000 kPa, such as from 100 kPa to 1,000 kPa, from 100 kPa to 300 kPa, from 200 kPa to 2000 kPa, from 200 kPa to 1000 kPa, from 200 kPa to 300 kPa, from 300 kPa to 2000 kPa, from 300 kPa to 1000 kPa, or at about atmospheric pressure (i.e., about 101.3 kPa). The portion of the first reactor effluent 114 and the cracking catalyst 142 may be contacted in the second reactor 140 for a contact time of from 0.1 seconds to 30 seconds, such as from 0.1 seconds to 20 seconds, from 0.1 seconds to 10 seconds, from 0.1 seconds to 5 seconds, from 1 second to 30 seconds, from 1 second to 20 seconds, from 1 second to 10 seconds from 1 second to 5 seconds, from 3 seconds to 30 seconds, from 3 seconds to 20 seconds, from 3 seconds to 10 seconds, from 5 seconds to 30 seconds, from 5 seconds to 20 seconds, or from 5 seconds to 10 seconds. The contact time may refer to the time that the reactants in the portion of the first reactor effluent 114 are in contact with the cracking catalyst 142 at the reaction temperature in the reaction zone before being separated in the separation zone downstream of the reaction zone.

A catalyst-to-oil weight ratio in the second reactor 140 may be from 3:1 to 20:1, such as from 3:1 to 10:1, from 3:1 to 8:1, from 4:1 to 20:1, from 4:1 to 10:1, from 4:1 to 8:1, from 6:1 to 20:1, from 6:1 to 10:1, from 6:1 to 8:1, or from 8:1 to 20:1. The catalyst-to-oil weight ratio in the second reactor 140 refers to the ratio of the mass flow rate of the cracking catalyst 142 to the mass flow rate of the portion of the first reactor effluent 114 passed to the second reactor 140. In embodiments, the second reactor 140 may be a downer reactor. When the second reactor 140 is a downer reactor, the catalyst-to-oil weight ratio in the second reactor 140 may be from 3:1 to about 60:1, such as from 3:1 to 50:1, from 3:1 to 40:1, from 4:1 to 60:1, from 4:1 to 50:1, from 4:1 to 40:1, from 6:1 to 60:1, from 6:1 to 50:1, or from 6:1 to 40:1.

Referring again to FIG. 2, as previously discussed, the second reactor effluent 144 may be separated from the used cracking catalyst 146 in the second fluid-solid separation unit 148 disposed at the outlet of the reaction zone of the second reactor 140. The second reactor effluent 144 may be passed from the second reactor 140 directly to the product separation system 150. The used cracking catalyst 146 may be passed directly to the cracking catalyst regenerator 170. The second reactor effluent 144 may be combined with the light effluent 132 upstream of the product separation system 150 or the light effluent 132 and second reactor effluent 144 may be passed separately to the product separation system 150 and combined in the product separation system 150. The light effluent 132 and the second reactor effluent 144 may be separated in the product separation system 150 as previously discussed in the present disclosure.

The processes of the present disclosure may further include separating the second reactor effluent 144, or the second reactor effluent 144 and the light effluent 132, in the product separation system 150 to produce a plurality of product streams, such as but not limited to an ethylene stream, a propylene stream, a mixed butenes stream, a BTX stream, a naphtha stream, a gasoline stream, or combinations thereof. In embodiments, the product streams may include one or more light olefin streams 152, a light aromatic stream 154, a gasoline stream 156, a bottom stream 158, or combinations thereof.

The process may include providing the plastic derived oil stream 102 comprising hydrocarbons and from 10 parts per million by weight (ppmw) to 500 ppmw by halogen-containing compounds based on the total weight of the plastic derived oil stream 102. In embodiments, the processes may include producing the plastic derive oil stream 102. Producing the plastic derived oil stream 102 may include passing solid waste plastic to a dehalogenation unit 10, which melts the solid waste plastic and removes some halogen compounds from the solid waste plastic to produce the liquefied plastic stream 14. The processes may further include passing the liquefied plastic stream 14 to the pyrolysis unit 20 and subjecting the liquefied plastic stream 14 to pyrolysis in the pyrolysis unit 20 to produce the plastic derived oil stream 102.

Referring again to FIG. 2, in embodiments, the plastic derived oil stream 102 from the pyrolysis reactor 20 may have a concentration of inorganic contaminants, polar contaminants, halogen containing compounds, or combinations thereof that is great enough to cause problems in the first reactor 110, the second reactor 140, or both, such as but not limited to deactivation of the decontamination catalyst, rapid saturation of the adsorbent in the adsorption unit 120, rapid corrosion of equipment, or other problems. Thus, the plastic derived oil stream 102 may be treated upstream of the first reactor 110 to reduce the concentration of contaminants in the plastic derived oil stream 102 to produce a treated plastic derived oil 232, which may then be introduced to the first reactor 110. In embodiments, the system 100 may include a water wash unit 220 and an upstream adsorption unit 230, which are both disposed upstream of the first reactor 110 and downstream of the pyrolysis reactor 20.

The wash water unit 220 may be disposed downstream of the pyrolysis reactor 20. All or a portion of the plastic derived oil stream 102 may be passed from the pyrolysis reactor 20 to the wash water unit 220, such as being passed directly from the pyrolysis reactor 20 to the wash water unit 220. The wash water unit 220 may include one or a plurality of units operable to contact the plastic derived oil stream 102 with wash water 222 and then to separate the aqueous phase from the oil phase to produce a washed plastic derived oil 224 and used wash water 226. The methods disclosed herein may include washing the plastic derived oil stream 102 with the wash water 222 in the water wash unit 220 upstream of the first reactor 110. Washing the plastic derived oil stream 102 with the wash water 222 may remove inorganic and polar contaminants from the plastic derived oil stream 102 to produce the washed plastic derived oil 224. The washed plastic derived oil 224 may have a reduced concentration of inorganic contaminants, polar contaminants, halogen compounds, or combinations of these compared to the plastic derived oil stream 102. The used wash water 226 may be passed to one or more downstream unit operations to treat the used wash water 226. The washed plastic derived oil 224 may be passed out of the water wash unit 220.

The washed plastic derived oil 224 may be passed from the wash water unit 220 to the upstream adsorption unit 230, which may be disposed downstream of the wash water unit 220 and upstream of the first reactor 110. The upstream adsorption unit 230 may comprise one or more adsorbent beds containing an adsorbent material. The adsorbent materials may be any of the adsorbents previously described for the adsorption unit 120 for removing organic halide compounds. The upstream adsorption unit 230 may be operable to contact the washed plastic derived oil 224 with the adsorbents, which may adsorb additional organic halide compounds, such as organochloride compounds or other contaminants, from the washed plastic derived oil 224 to produce the treated plastic derived oil 232. The methods disclosed herein may include contacting the washed plastic derived oil 224 with the adsorbents in the upstream adsorption unit 230, where contact with the adsorbent removes organic halide compounds and other contaminants from the washed plastic derived oil 224 to produce the treated plastic derived oil 232.

This steps of washing the plastic derived oil stream 102 with the wash water 222 and treating the washed plastic derived oil 224 in the upstream adsorption unit 230 may be employed depending on the concentration of halogens and other contaminants in the plastic derived oil stream 102. In embodiments, the water wash unit 220 and the upstream adsorption unit 230 may be utilized when the concentration of organic chlorides and other organic halide compounds in the plastic derived oil stream 102 exceeds 100 ppmw based on the unit weight of the plastic derived oil stream 102. Treating the washed plastic derived oil 224 in the upstream adsorption unit 230 may further reduce the concentration of the organic chlorides to reduce the burden on the decontamination catalyst 112 in the first reactor 110. The wash water unit 220 and upstream adsorption unit 230 may also be used to increase the blending ratio of the treated plastic derived oil 232 with other supplemental feed streams 106 during co-processing. The blending ratio is the mass flow rate of the treated plastic derived oil 232 divided by the mass flow rate of the supplemental feed stream 106.

Referring again to FIG. 2, in embodiments, the system 100 may include a control system 200 for determining whether to pass the plastic derived oil stream 102 directly to the first reactor 110 or to divert the plastic derived oil stream 102 to the wash water unit 220 and the upstream adsorption unit 230. The system 100 may further include a sensor 190, a first control valve 192, and a second control valve 194. The decontamination catalyst valve 175, the cracking catalyst valve 185, or both may also be part of the control system 200. The sensor 190 may be disposed in contact with the plastic derived oil stream 102 downstream of the pyrolysis reactor 20 and upstream of the first reactor 110. The sensor 190 may be operable to determine a concentration of halogen-containing compounds in the plastic derived oil stream 102. The first control valve 192 may be disposed in the line transferring the plastic derived oil stream 102 directly to the first reactor 110 and may be operable to control the flow of the plastic derived oil stream 102 directly to the first reactor 110. The second control valve 194 may be disposed in parallel with the first control valve 192 and upstream of the wash water unit 220, such as in the line transferring the plastic derived oil stream 102 to the wash water unit 220. The second control valve 194 may be operable to control the flow of the plastic derived oil stream 102 to the wash water unit 220. The sensor 190, first control valve 192, and second control valve 194 may each be communicatively coupled to the control system 200 through wired or wireless communication channels.

The control system 200 may include one or a plurality of processors 202, one or a plurality of memory modules 204 communicatively coupled to the processors 202, and computer readable and executable instructions 206 stored in the memory modules 204. The control system 200 may be communicatively coupled to the sensor 190, the first control valve 192, the second control valve 194, the decontamination catalyst valve 175, the cracking catalyst valve 185, or combinations of these. The control system 200 may be configured to control operation or actuation of the first control valve 192, the second control valve 194, or both based on information from the sensor 190 to send the plastic derived oil stream 102 directly to the first reactor 110 or to the water wash unit 220 and upstream adsorption unit 230 upstream of the first reactor 110. The processes and methods disclosed herein may be embodied in the computer readable and executable instructions 206 and practiced by executing the computer readable and executable instructions 206 by the one or more processors 202 of the control system 200.

Referring again to FIG. 2, the processes disclosed herein may include measuring concentrations of halogen-containing compounds, contaminants, or both in the plastic derived oil stream 102 upstream of the first reactor 110, and comparing the concentrations of the halogen containing compounds, contaminants, or both in the plastic derived oil stream 102 to a threshold concentration. When the concentrations of the halogen-containing compounds, contaminants, or both in the plastic derived oil stream 102 are below the threshold concentration, the processes may include passing the plastic derived oil stream 102 directly to the first reactor 110. When the concentrations of the halogen-containing compounds, contaminants, or both in the plastic derived oil stream 102 are greater than or equal to the threshold concentration, the processes may include passing the plastic derived oil stream 102 to the water wash unit 220 and the upstream adsorption unit 230 to produce a treated plastic derived oil 232 and then passing the treated plastic derived oil 232 to the first reactor 110. In embodiments, the threshold concentration of halogen-containing compounds in the plastic derived oil stream 102 may be less than or equal to 100 ppmw (parts per million by weight).

In embodiments, the processes disclosed herein may include measuring concentrations of halogen-containing compounds, heavy compounds, or both in the plastic derived oil stream 102 upstream of the first reactor 110 with the sensor 190, and adjusting the catalyst weight ratio of the mixed catalyst passed to the first reactor 110 based on the concentrations of halogen-containing compounds, heavy compounds, or both in the plastic derived oil stream 102, such as by manipulating the decontamination catalyst valve 175, the cracking catalyst valve 185, or both.

Referring to FIG. 2, as previously discussed, the control system 200 may include the one or more processors 202 and one or more memory modules 204. The one or more processors 202 may include any device capable of executing computer-readable executable instructions stored on a non-transitory computer-readable medium. Accordingly, each processor 202 may include an integrated circuit, a microchip, a computer, and/or any other computing device. The one or more memory modules 204 are communicatively coupled to the one or more processors 202 over a communication path. The one or more memory modules 204 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 204 may be configured to store machine readable and executable instructions 206 for operating one or more components of the system 100.

Embodiments of the present disclosure include logic stored on the one or more memory modules 204 that includes machine-readable and executable instructions or an algorithm written in any programming language of any generation (e.g., 1GL, 2GL, 3GL, 4GL, and/or 5GL) such as, machine language that may be directly executed by the one or more processors 202, assembly language, obstacle-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

EXAMPLES

The various embodiments of systems and processes of the present disclosure will be further clarified by the following examples. The examples are illustrative in nature, and should not be understood to limit the subject matter of the present disclosure.

Example 1: Direct Catalytic Cracking of Plastic Derived Oil

A plastic derived oil produced from solid waste plastic was catalytically cracked according to an Advanced Cracking Evaluation (ACE) test procedure to show the products produced through catalytically cracking a plastic derived oil. The ACE tests were conducted using a micro-activity cracking testing (MAT) unit. The MAT unit and ACE testing process is described more in detail in U.S. Pat. No. 6,069,012. The ACE testing was performed with a catalyst to oil weight ratio of 8, and the catalytic cracking was conducted at temperatures of 550° C., 575° C., 600° C. and 650° C.

For each experimental run, the reactor effluent was passed out of the MAT unit and sent to a gas/liquid separator, which separated the reactor effluent into a liquid product stream and a gaseous product stream. The gaseous product stream was analyzed by an online gas chromatography system (Agilent 7890 gas chromatograph) equipped with both FID and TCD detectors. The liquid product stream was analyzed according to the offline analytical test methods. In particular, the liquid product stream was analyzed by simulated distillation according to test method EN 15199-2 using the Agilent 7890 gas chromatograph. For the simulated distillation, the analysis was conducted for four distillation fractions: (1) light hydrocarbon gases having 1-4 carbon atoms; (2) a naphtha fraction having a boiling point range of from C5 (boiling point temperature >25° C.) to 221° C.; (3) a middle distillate fraction having a boiling point range of from 221° C. to 343° C.; and (4) a heavy distillate fraction having boiling point temperatures greater than 343° C. The light hydrocarbon gases were further classified into fuel gas (hydrogen and methane), C2-C4 paraffins, ethylene, propylene, and butenes. Coke is quantified after passing an air stream through the MAT unit at high temperatures to burn the coke into a mixture of carbon monoxide, carbon dioxide, and water, and then passing the combustion gases through a calibrated infrared analyzer. The composition of the plastic derived oil and the reaction products are provided in Table 2 and in FIG. 4.

TABLE 2

| Constituent | Plastic derived oil | 1 | 2 | 3 | 4 |
|---|---|---|---|---|---|
| Reaction Temperature (° C.) | N/A | 550 | 575 | 600 | 650 |
| Fuel Gas (wt. %) | — | 1.8 | 2.0 | 3.7 | 5.9 |
| C2-C4 paraffin (wt. %) | — | 22.8 | 17.0 | 17.5 | 12.2 |
| Ethylene (wt. %) | — | 6.1 | 6.5 | 9.8 | 15.1 |
| Propylene (wt. %) | — | 9.6 | 10.0 | 12.1 | 16.7 |
| Butenes (wt. %) | — | 8.5 | 8.5 | 7.8 | 8.3 |
| Naphtha (wt. %) | 38.1 | 35.1 | 43.2 | 45.0 | 37.6 |
| Middle Distillate (wt. %) | 47.9 | 10.7 | 8.38 | <1 | <1 |
| Heavy Distillate (wt. %) | 14.1 | 2.6 | 1.9 | <1 | <1 |
| Coke (wt. %) | — | 2.8 | 2.6 | 2.8 | 3.3 |

Referring to FIG. 4 and Table 2, the plastic derived oil is a suitable feed for fluidized catalytic cracking, where the plastic derived oil can be converted to generate circular chemicals such as ethylene, propylene, and butenes, as well as low carbon footprint fuels (naphtha). The reactor set up in this disclosure, allows for the continuous decontamination and the catalytic cracking of plastic derived oil to generate circular chemicals and a halogen free low carbon footprint fuel.

Example 2: Decontamination of Plastic Derived Oil with Decontamination Catalyst

In Example 2, a plastic derived oil was subjected to decontamination by contacting the plastic derived oil with a decontamination catalyst in a fixed bed reactor. For Example 2, the decontamination catalyst was red mud, which is a bauxite residue generated during the processing of bauxite into alumina using the Bayer process. Red mud comprises mainly iron oxide ($Fe_2O_3$) in combination with other oxides. The composition for the red mud used in Example 2 for the decontamination catalyst is provided in Table 3.

TABLE 3

Composition of red mud decontamination catalyst of Example 2

| Major Constituents | |
|---|---|
| Composition | Weight % |
| $Fe_2O_3$ | 30-60 |
| $Al_2O_3$ | 10-20 |
| $SiO_2$ | 3-50 |
| $Na_2O$ | 2-10 |
| CaO | 2-8 |
| $TiO_2$ | Trace-25 |
| **Minor Constituents** | |
| Composition | (mg/kg) |
| U | 50-60 |
| Ga | 60-80 |
| V | 730 |
| Zr | 1230 |
| Sc | 60-120 |
| Cr | 497 |
| Mn | 85 |
| Y | 60-150 |
| Ni | 31 |

TABLE 3-continued

Composition of red mud decontamination catalyst of Example 2

| | |
|---|---|
| Zn | 20 |
| Lanthanides | 0.1%-1% |
| Th | 20-30 |

The red mud catalyst was evaluated using the Advanced Cracking Evaluation (ACE) test procedure using the MAT unit, as discussed in Example 1. The ACE testing was performed with a catalyst to oil weight ratio of 8, and the catalytic cracking was conducted at temperatures of 400° C. The plastic derived oil for Example 2 had the composition provided in Table 4. The results of the ACE testing are provided in Table 4. As demonstrated by the results in Table 4, contact with the contamination catalyst comprising the red mud of Example 2 at 400° C. resulted in very little reaction to convert the heavier hydrocarbons of the plastic derived oil to light olefins. This indicates that the red mud would be suitable for a decontamination catalyst.

TABLE 4

Product distribution for Example 2

| Constituents | Plastic Derived Oil (wt. %) | Reaction Products at 400° C. (wt. %) |
|---|---|---|
| Fuel Gas (H2 + C1) | — | 0.42 |
| C2-C4 Paraffins | — | 0.97 |
| C2= | — | 0.72 |
| C3= | — | 1.8 |
| C4= (Butenes) | — | 1.78 |
| Light Naphtha | 23.8 | 12.16 |
| Jet fuel (150-300 C.) | 49.7 | 49.5 |
| Diesel (300-343) | 15.2 | 16.74 |
| Bottoms (343 C.+) | 11.3 | 14.81 |
| Coke | — | 1.11 |

Additionally, the plastic derived oil and the reaction products produced at 400° C. in Example 2 were tested for concentration of chlorine. The plastic derived oil had an initial concentration of chlorine-containing compounds of 245 ppmw. The reaction products produced from the ACE evaluation of Example 2 had a concentration of chlorine-containing compounds of about 4.8 ppmw. As shown by Example 3, using a decontamination catalyst comprising red mud can reduce the concentration of chlorine-containing compounds from 245 ppmw in to 4.8 ppmw at a temperature of 400° C. This result shows that the red mud decontamination catalyst was able to reduce the chloride concentration by 98%, making it suitable for the decontamination catalyst.

Because the reaction of the red mud decontamination catalyst is different from a zeolite catalyst that is used to crack plastic derived oil, the decontamination catalyst comprising the red mud should be regenerated differently from the cracking catalysts. Regeneration can be carried out at high temperatures in the presence of oxygen. During regeneration of the coked red mud, the coke is burned off, and chlorine or HCl is released in the flue gas. The chlorine and HCl released can destroy the zeolite structures of the cracking catalysts through dealumination, as previously discussed in the present disclosure.

A first aspect of the present disclosure may be directed to a process for upgrading plastic derived oil, where the process may comprise contacting a plastic derived oil stream with a mixed catalyst in a first reactor. The first reactor may be a fluidized bed reactor, and the mixed catalyst may comprise a mixture of a decontamination catalyst and a cracking catalyst different from the decontamination catalyst. The contacting the plastic derived oil stream with the mixed catalyst at reaction conditions may produce a first reactor effluent having reduced concentrations of halogen-containing compounds compared to the plastic derived oil stream. The process may further comprise separating the first reactor effluent from the used mixed catalyst, passing at least a portion of the first reactor effluent to a second reactor disposed downstream of the first reactor, and contacting the at least a portion of the first reactor effluent with the cracking catalyst at cracking reaction conditions in the second reactor. The contacting the at least a portion of the first reactor effluent with the cracking catalyst at the reaction conditions in the second reactor may catalytically crack the portion of the first reactor effluent to produce a second reactor effluent comprising light olefins, naphtha range hydrocarbons, or combinations thereof. The process may further comprise separating the second reactor effluent from the used cracking catalyst to produce a first used cracking catalyst, separating the used mixed catalyst to produce a used decontamination catalyst and a second used cracking catalyst, regenerating the used decontamination catalyst in a decontamination catalyst regenerator to produce a regenerated decontamination catalyst, and regenerating the first used cracking catalyst and the second used cracking catalyst in a cracking catalyst regenerator separate from the decontamination catalyst regenerator, where regenerating the first used cracking catalyst and second used cracking catalyst in the cracking catalyst regenerator may reduce exposure of the cracking catalyst to halogen-containing compounds produced during regeneration of the used decontamination catalyst.

A second aspect of the present disclosure may include the first aspect, further comprising passing a first portion of the regenerated cracking catalyst to the second reactor and passing a second portion of the regenerated cracking catalyst and the regenerated decontamination catalyst to the first reactor, where at least a portion of the cracking catalyst in the mixed catalyst may comprise the second portion of the regenerated cracking catalyst and at least a portion of the decontamination catalyst in the mixed catalyst may comprise the regenerated decontamination catalyst.

A third aspect of the present disclosure may include either one of the first or second aspects, where contacting the plastic derived oil stream with the mixed catalyst comprising the decontamination catalyst and the cracking catalyst may cause catalytic cracking of heavy compounds in the plastic derived oil stream to increase an amount of halogen-containing compounds removed from the plastic derived oil stream in the first reactor.

A fourth aspect of the present disclosure may include any one of the first through third aspects, where separating the used mixed catalyst may comprise separating the used mixed catalyst according to density into the used decontamination catalyst and the second used cracking catalyst.

A fifth aspect of the present disclosure may include the fourth aspect, where the decontamination catalyst may have a density of from 1.0 $g/cm^3$ to 3.5 $g/cm^3$, and the cracking catalyst may have a density of from 0.6 $g/cm^3$ to 1.0 $g/cm^3$.

A sixth aspect of the present disclosure may include any one of the first through fifth aspects, where a catalyst weight ratio of the cracking catalyst to the decontamination catalyst in the mixed catalyst may be less than or equal to 1, where the catalyst weight ratio is a mass flow rate of the cracking catalyst through the first reactor divided by a mass flow rate of the decontamination catalyst through the first reactor.

A seventh aspect of the present disclosure may include the sixth aspect, where the catalyst weight ratio of the mixed catalyst may be from 0.1 to 1.

An eighth aspect of the present disclosure may include either one of the sixth or seventh aspects, further comprising adjusting the catalyst weight ratio in response to a concentration of the halogen-containing compounds in the plastic derived oil, a concentration of heavy compounds in the plastic derived oil, or both, where the heavy compounds comprise constituents of the plastic derived oil having boiling point temperatures greater than or equal to 343° C.

A ninth aspect of the present disclosure may include any one of the first through eighth aspects, where regenerating the used decontamination catalyst may comprise contacting the used decontamination catalyst with a regeneration gas in the decontamination catalyst regenerator, where the regeneration gas may be an oxygen-containing gas.

A tenth aspect of the present disclosure may include the ninth aspect, comprising contacting the used decontamination catalyst with the regeneration gas at a regeneration temperature of from 400° C. to 700° C., or from 400° C. to 600° C.

An eleventh aspect of the present disclosure may include the tenth aspect, where the contacting the used decontamination catalyst with the regeneration gas at the regeneration temperature may cause reaction of metal halides on surfaces of the used decontamination catalyst to produce halogen compounds, and the process further comprises passing a flue gas out of the decontamination catalyst regenerator, where the flue gas comprises the halogen compounds.

A twelfth aspect of the present disclosure may include any one of the first through eleventh aspects, where regenerating the used cracking catalyst may comprise contacting the used cracking catalyst with a regeneration gas in the cracking catalyst regenerator, where the regeneration gas may be an oxygen-containing gas.

A thirteenth aspect of the present disclosure may include the twelfth aspect, comprising contacting the used cracking catalyst with the regeneration gas at a regeneration temperature of from 500° C. to 800° C.

A fourteenth aspect of the present disclosure may include the thirteenth aspect, where contacting the used cracking catalyst with the regeneration gas at the regeneration temperature may cause coke deposits on the used cracking catalyst to undergo oxidation, where oxidation of the coke deposits may remove the coke deposits from the used cracking catalyst to produce the regenerated cracking catalyst, may heat the regenerated cracking catalyst, or both.

A fifteenth aspect of the present disclosure may include any one of the first through fourteenth aspects, comprising contacting the plastic derived oil stream with the mixed catalyst in the first reactor at a temperature of from 300° C. to 450° C., at a pressure of from 100 kPa to 300 kPa, and at a catalyst-to-oil weight ratio of greater than or equal to 0.2, wherein the catalyst-to-oil weight ratio in the first reactor is equal to a mass flow rate of the mixed catalyst divided by a mass flow rate of the plastic derived oil in the first reactor at steady state.

A sixteenth aspect of the present disclosure may include the fifteenth aspect, further comprising adjusting the catalyst-to-oil weight ratio in the first reactor based on a concentration of the halogen-containing compounds in the plastic derived oil stream.

A seventeenth aspect of the present disclosure may include the sixteenth aspect, where adjusting the catalyst-to-oil weight ratio in the first reactor may comprise determining a concentration of the halogen-containing compounds in the plastic derived oil stream, and adjusting a flow rate of the plastic derived oil to the first reactor, a flow rate of the mixed catalyst to the first reactor, or both, where the catalyst-to-oil weight ratio may be adjusted in proportion to the concentration of the halogen-containing compounds in the plastic derived oil stream.

An eighteenth aspect of the present disclosure may include any one of the first through seventeenth aspects, comprising contacting the at least a portion of the first reactor effluent with the cracking catalyst in the second reactor at a temperature of from 500° C. to 650° C., at a pressure of 100 kPa to 300 kPa, and at a catalyst-to-oil weight ratio of greater than or equal to 2, wherein the catalyst-to-oil weight ratio in the second reactor is equal to a mass flow rate of the cracking catalyst divided by a mass flow rate of the at least a portion of the first reactor effluent in the second reactor at steady state.

A nineteenth aspect of the present disclosure may include any one of the first through eighteenth aspects, further comprising passing a supplemental feed stream to the first reactor or combining the supplemental feed stream with the plastic derived oil stream upstream of the first reactor.

A twentieth aspect of the present disclosure may include any one of the first through nineteenth aspects, where the first reactor, the second reactor, or both are each a riser reactor or a downer reactor.

A twenty-first aspect of the present disclosure may include any one of the first through twentieth aspects, where the decontamination catalyst may comprise a plurality of metal oxides, where each of the metal oxides are randomly distributed throughout the decontamination catalyst.

A twenty-second aspect of the present disclosure may include any one of the first through twenty-first aspects, where the decontamination catalyst may comprise a plurality of metal oxides selected from the group consisting of $Fe_2O_3$, $ZrO_2$, $CeO_2$, $Al_2O_3$, $TiO_2$, CaO, $SiO_2$, $Na_2O$, MgO, and combinations thereof.

A twenty-third aspect of the present disclosure may include any one of the first through twenty-second aspects, further comprising contacting the first reactor effluent with an adsorbent in an adsorption unit disposed downstream of the first reactor and upstream of the second reactor to produce a treated first reactor effluent having a reduced concentration of halogen-containing compounds compared to the first reactor effluent.

A twenty-fourth aspect of the present disclosure may include the twenty-third aspect, further comprising separating the treated first reactor effluent in a first reactor effluent separation system to produce a light effluent and a heavy stream, and passing the heavy stream to the second reactor as the at least a portion of the treated first reactor effluent, wherein the first reactor effluent separation system may be upstream of the second reactor and downstream of the adsorption unit.

A twenty-fifth aspect of the present disclosure may be directed to a system for upgrading plastic derived oil, where the system may comprise a first reactor containing a mixed catalyst comprising a mixture of a decontamination catalyst and a cracking catalyst that is different from the decontamination catalyst. The first reactor may be a fluidized bed reactor and may be configured to contact a plastic derived oil stream with the mixed catalyst to produce a first reactor effluent. The system may further include a first fluid-solid separation unit disposed at an outlet end of the first reactor, where the first fluid-solid separation unit may be configured to separate the first reactor effluent from a used mixed catalyst. The system may further comprise a second reactor containing the cracking catalyst. The second reactor may be a fluidized bed reactor and may be configured to contact at least a portion of the first reactor effluent with the cracking catalyst to produce a second reactor effluent. The system may further include a second fluid-solid separation unit disposed at an outlet end of the second reactor, where the second fluid-solid separation unit may be configured to separate the second reactor effluent from a first used cracking catalyst. The system may comprise a catalyst separator disposed downstream of the first fluid-solid separation unit and configured to separate the used mixed catalyst to produce a used decontamination catalyst and a second used cracking catalyst. The system may comprise a decontamination catalyst regenerator disposed downstream of the catalyst separator, where the decontamination catalyst regenerator may be configured to regenerate the used decontamination catalyst to produce regenerated decontamination catalyst. The system may further comprise a cracking catalyst regenerator disposed downstream of the second fluid-solid separation unit, where the cracking catalyst regenerator may be configured to regenerate the first used cracking catalyst and the second used cracking catalyst to produce regenerated cracking catalyst.

A twenty-sixth aspect of the present disclosure may include the twenty-fifth aspect, further comprising: a first regenerated cracking catalyst transfer line in fluid communication with the cracking catalyst regenerator and an inlet end of the first reactor, wherein the first regenerated cracking catalyst transfer line may be configured to transport regenerated catalyst from the cracking catalyst regenerator to the first reactor; and a second regenerated cracking catalyst transfer line in fluid communication with the cracking catalyst regenerator and an inlet end of the second reactor, where the second regenerated cracking catalyst transfer line may be configured to transport regenerated catalyst from the cracking catalyst regenerator to the second reactor.

A twenty-seventh aspect of the present disclosure may include either one of the twenty-fifth or twenty-sixth aspects, where the catalyst separator may be configured to separate the mixed catalyst by density into the used decontamination catalyst and the used cracking catalyst.

A twenty-eighth aspect of the present disclosure may include any one of the twenty-fifth through twenty-seventh aspects, where the cracking catalyst regenerator may be in fluid communication with the second fluid-solid separation unit and the catalyst separator to pass the first used cracking catalyst and the second used cracking catalyst to the cracking catalyst regenerator.

A twenty-ninth aspect of the present disclosure may include any one of the twenty-fifth through twenty-eighth aspects, where the decontamination catalyst regenerator may be in fluid communication with the catalyst separator to pass the used decontamination catalyst from the catalyst separator to the decontamination catalyst regenerator.

A thirtieth aspect of the present disclosure may include any one of the twenty-fifth through twenty-ninth aspects, further comprising an adsorption unit disposed downstream of the first reactor and upstream of the second reactor, where the adsorption unit may be in fluid communication with the first fluid-solid separator to pass the first reactor effluent to the adsorption unit. The adsorption unit may comprise an adsorbent and may be configured to contact the first reactor effluent with the adsorbent.

A thirty-first aspect of the present disclosure may include the thirtieth aspect, further comprising a first effluent separation system disposed downstream of the adsorption unit and the second reactor, where: the first effluent separation system may be configured to separate the treated first reactor effluent to produce a light effluent and a heavy stream; and the first effluent separation system may be in fluid communication with the second reactor to pass the heavy stream to the second reactor.

A thirty-second aspect of the present disclosure may include any one of the twenty-fifth through thirty-first aspects, further comprising the plastic derived oil stream comprising the plastic derived oil, where the plastic derived oil stream may have a concentration of halogen-containing compounds of greater than or equal to 100 ppmw based on the total weight of the plastic derived oil stream.

A thirty-third aspect of the present disclosure may include the thirty-second aspect, further comprising: a water wash unit disposed upstream of the first reactor, where the water wash unit may be configured to contact the plastic derived oil stream with water to remove inorganic contaminants, polar contaminants, or both from the plastic derived oil to produce a washed plastic derived oil; and an upstream adsorption unit disposed between the water wash unit and the first reactor, where the upstream adsorption unit may be configured to contact the washed plastic derived oil with an adsorbent to remove at least a portion of the halogen-containing compounds from the washed plastic derived oil to produce a treated plastic derived oil.

A thirty-fourth aspect of the present disclosure may include the thirty-third aspect, further comprising: a sensor disposed in the plastic derived oil stream and configured to measure a concentration of the halogen-containing compounds in the plastic derived oil; a first control valve disposed upstream of the first reactor and configured to control a flow of the plastic derived oil stream to the first reactor; a second control valve disposed upstream of the water wash unit and configured to control a flow of the plastic derived oil stream to the water wash unit; and a control system communicatively coupled to the sensor, the first control valve, and the second control valve, where the control system may comprise one or more processors, one or more memory modules, and computer readable and executable instructions stored on the one or more memory modules.

A thirty-fifth aspect of the present disclosure may include the thirty-fourth aspect, where the machine readable and executable instructions, when executed by the one or more processors, may cause the system to automatically: measure a concentration of the halogen-containing compounds in the plastic derived oil steam with the sensor; compare the concentrations of the halogen-containing compounds to a threshold concentration; when the concentration of the halogen-containing compounds is less than the threshold concentration, pass the plastic derived oil stream directly to the first reactor; and when the concentration of the halogen-containing compounds is greater than or equal to the threshold concentration, pass the plastic derived oil to the water wash unit and then to the upstream adsorption unit.

A thirty-sixth aspect of the present disclosure may include any one of the twenty-fifth through thirty-fifth aspects, further comprising: a pyrolysis reactor upstream of the first reactor, where the pyrolysis reactor may be configured to subject a liquefied plastic stream to pyrolysis to produce the plastic derived oil stream; and a dehalogenation reactor upstream of the pyrolysis reactor, where the dehalogenation reactor may be configured to melt solid plastic waste to produce the liquefied plastic stream.

A thirty-seventh aspect of the present disclosure may include any one of the twenty-fifth through thirty-sixth aspects, further comprising a product separation system disposed downstream of the second reactor, where the product separation system may be configured to separate the second reactor effluent to produce a plurality of product streams.

A thirty-eighth aspect of the present disclosure may include any one of the twenty-fifth through thirty-seventh aspects, where the decontamination catalyst may comprise a plurality of metal oxides selected from the group consisting of $Fe_2O_3$, $ZrO_2$, $CeO_2$, $Al_2O_3$, $TiO_2$, CaO, $SiO_2$, $Na_2O$, MgO, and combinations thereof.

A thirty-ninth aspect of the present disclosure may include any one of the twenty-fifth through thirty-eighth aspects, where the decontamination catalyst may comprise mixed metal oxide particles (MMO particles), where the MMO particles comprise one or more of the following: red mud comprising from 5 wt. % to 60 wt. % $Fe_2O_3$, from 5 wt. % to 30 wt. % $Al_2O_3$, from 0 wt. % to 15 wt. % $TiO_2$, from 2 wt. % to 14 wt. % CaO, from 3 wt. % to 50 wt. % $SiO_2$, and from 1 wt. % to 10 wt. % $Na_2O$ based on the total weight of the red mud; cement raw meal comprising from 1 wt. % to 18 wt. % $Fe_2O_3$, from 40 wt. % to 50 wt. % $Al_2O_3$, from 35 wt. % to 40 wt. % CaO, and from 5 wt. % to 10 wt. % $SiO_2$ based on the total weight of the cement raw meal; cement slag comprising from 8 wt. % to 24 wt. % $Al_2O_3$, from 30 wt. % to 50 wt. % CaO, from 28 wt. % to 38 wt. % $SiO_2$, and from 1 wt. % to 18 wt. % MgO based on the total weight of the cement slag; a co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$ based on the total weight of the co-precipitated MMO catalyst; or combinations thereof.

A fortieth aspect of the present disclosure may include the thirty-ninth aspect, where the MMO particles may comprise the co-precipitated MMO catalyst particles comprising from 60 wt. % to 95 wt. % $Fe_2O_3$, from 1 wt. % to 20 wt. % $ZrO_2$, from 0.1 wt. % to 10 wt. % $CeO_2$, and from 1 wt. % to 20 wt. % $Al_2O_3$, where the weight percentages are based on the total weight of the MMO particles.

A forty-first aspect of the present disclosure may include the fortieth aspect, where the MMO particles may comprise 83 wt. % $Fe_2O_3$, 7.5 wt. % $ZrO_2$, 2.5 wt. % $CeO_2$, and 7.0 wt. % $Al_2O_3$ based on the total weight of the MMO particles.

A forty-second aspect of the present disclosure may include any one of the twenty-fifth through forty-first aspects, further comprising a control system comprising one or more processors, one or more memory modules, and computer readable and executable instructions stored on the one or more memory modules; a sensor disposed in the plastic derived oil stream and configured to measure a concentration of the halogen-containing compounds, a concentration of heavy compounds, or both in the plastic derived oil stream; a decontamination catalyst valve disposed in a regenerated decontamination catalyst line that fluidly couple the decontamination catalyst regenerator to an inlet of the first reactor; and a cracking catalyst valve disposed in a second regenerated cracking catalyst transfer line that fluidly couples the cracking catalyst regenerator to the inlet of the first reactor. The control system may be communicatively coupled to the sensor and to the decontamination catalyst valve, the cracking catalyst valve, or both. The machine readable and executable instructions, when executed by the one or more processors, may cause the system to automatically: measure a concentration of the halogen-containing compounds, a concentration of heavy compounds, or both in the plastic derived oil steam with the sensor; and adjust a position of the decontamination catalyst valve, a position of the cracking catalyst valve, or both to change a catalyst weight ratio of the mixed catalyst in the first reactor based on the concentration of the halogen-containing compounds, the concentration of heavy compounds, or both in the plastic derived oil stream.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading plastic derived oil, the process comprising:

combining a decontamination catalyst with a first portion of a cracking catalyst to produce a mixed catalyst, wherein the cracking catalyst is different from the decontamination catalyst;

contacting a plastic derived oil stream with the mixed catalyst in a first reactor, where the first reactor is a fluidized bed reactor and the contacting the plastic derived oil stream with the mixed catalyst at reaction conditions produces a first reactor effluent having reduced concentrations of halogen-containing compounds compared to the plastic derived oil stream;

separating the first reactor effluent from the used mixed catalyst;

separating the used mixed catalyst to produce a used decontamination catalyst and a used first portion of the cracking catalyst;

contacting at least a portion of the first reactor effluent with a second portion of the cracking catalyst at cracking reaction conditions in the second reactor, where the contacting the at least a portion of the first reactor effluent with the second portion of the cracking catalyst at the reaction conditions in the second reactor catalytically cracks the portion of the first reactor effluent to produce a second reactor effluent comprising light olefins, naphtha range hydrocarbons, or combinations thereof;

separating the second reactor effluent from the used cracking catalyst second portion of the cracking catalyst to produce a first used cracking catalyst used second portion of the cracking catalyst;

regenerating the used decontamination catalyst in a decontamination catalyst regenerator to produce a regenerated decontamination catalyst;

combining the used first portion of the cracking catalyst and the used second portion of the cracking catalyst to produce a used cracking catalyst; and regenerating the used cracking catalyst in a cracking catalyst regenerator separate from the decontamination catalyst regenerator to produce a regenerated cracking catalyst, where regenerating the used cracking catalyst in the cracking catalyst regenerator reduces exposure of the cracking catalyst to halogen-containing compounds produced during regeneration of the used decontamination catalyst;

wherein the decontamination catalyst comprises a plurality of metal oxides, each of the metal oxides are randomly distributed throughout the decontamination catalyst, and the plurality of metal oxides are selected from the group consisting of $Fe_2O_3$, $ZrO_2$, $CeO_2$, $Al_2O_3$, $TiO_2$, CaO, $Na_2O$, MgO, and combinations thereof.

2. The process of claim 1, further comprising:

passing a first portion of the regenerated cracking catalyst and the regenerated decontamination catalyst to the first reactor, where the first portion of the cracking catalyst in the mixed catalyst comprises the first portion of the regenerated cracking catalyst and the decontamination catalyst in the mixed catalyst comprises the regenerated decontamination catalyst; and passing a second portion of the regenerated cracking catalyst to the second reactor, where the second portion of the cracking catalyst in the second reactor comprises the second portion of the regenerated cracking catalyst.

3. The process of claim 1, where contacting the plastic derived oil stream with the mixed catalyst comprising the decontamination catalyst and the first portion of the cracking catalyst causes catalytic cracking of heavy compounds in the plastic derived oil stream to increase an amount of halogen-containing compounds removed from the plastic derived oil stream in the first reactor.

4. The process of claim 1, where separating the used mixed catalyst comprises separating the used mixed catalyst according to density into the used decontamination catalyst and the catalyst used first portion of the cracking catalyst, where the decontamination catalyst has a density of from 1.0 $g/cm^3$ to 3.5 $g/cm^3$, and the used first portion of the cracking catalyst has a density of from 0.6 $g/cm^3$ to 1.0 $g/cm^3$.

5. The process of claim 1, where a catalyst weight ratio of the first portion of the cracking catalyst to the decontamination catalyst in the mixed catalyst is less than or equal to 1, where the catalyst weight ratio is a mass flow rate of the first portion of the cracking catalyst through the first reactor divided by a mass flow rate of the decontamination catalyst through the first reactor.

6. The process of claim 5, further comprising adjusting the catalyst weight ratio in response to a concentration of the halogen-containing compounds in the plastic derived oil, a concentration of heavy compounds in the plastic derived oil, or both, where the heavy compounds comprise constituents of the plastic derived oil having boiling point temperatures greater than or equal to 343° C.

7. The process of claim 1, where regenerating the used decontamination catalyst comprises contacting the used decontamination catalyst with a regeneration gas in the decontamination catalyst regenerator at a regeneration temperature of from 400° C. to 700° C., where the regeneration gas is an oxygen-containing gas and where the contacting the used decontamination catalyst with the regeneration gas at the regeneration temperature causes reaction of metal halides on surfaces of the used decontamination catalyst to produce hydrogen halides, and the process further comprises passing a flue gas out of the decontamination catalyst regenerator, where the flue gas comprises the hydrogen halides.

8. The process of claim 1, where regenerating the used cracking catalyst comprises contacting the used cracking catalyst with a regeneration gas in the cracking catalyst regenerator at a regeneration temperature of from 500° C. to 800° C., where the regeneration gas is an oxygen-containing gas and where contacting the used cracking catalyst with the regeneration gas at the regeneration temperature causes coke deposits on the used cracking catalyst to undergo oxidation, where oxidation of the coke deposits removes the coke deposits from the used cracking catalyst to produce the regenerated cracking catalyst, heats the regenerated cracking catalyst, or both.

9. The process of claim 1, further comprising adjusting a catalyst-to-oil weight ratio in the first reactor based on a concentration of the halogen-containing compounds in the plastic derived oil stream, where adjusting the catalyst-to-oil weight ratio in the first reactor comprises:

determining a concentration of the halogen-containing compounds in the plastic derived oil stream; and adjusting a flow rate of the plastic derived oil to the first reactor, a flow rate of the mixed catalyst to the first reactor, or both, where the catalyst-to-oil weight ratio is adjusted in proportion to the concentration of the halogen-containing compounds in the plastic derived oil stream.

10. The process of claim 1, further comprising contacting the first reactor effluent with an adsorbent in an adsorption unit disposed downstream of the first reactor and upstream of the second reactor to produce a treated first reactor effluent having a reduced concentration of halogen-containing compounds compared to the first reactor effluent.

11. The process of claim 10, further comprising:

separating the treated first reactor effluent in a first reactor effluent separation system to produce a light effluent and a heavy stream; and passing the heavy stream to the second reactor as the at least a portion of the treated first reactor effluent, wherein the first reactor effluent separation system is upstream of the second reactor and downstream of the adsorption unit.

12. A system for upgrading plastic derived oil, the system comprising:

a first reactor containing a mixed catalyst comprising a mixture of a decontamination catalyst and a first portion of a cracking catalyst that is different from the decontamination catalyst, where the first reactor is a fluidized bed reactor, and the first reactor is configured to contact a plastic derived oil stream with the mixed catalyst to produce a first reactor effluent;

a first fluid-solid separation unit disposed at an outlet end of the first reactor, the first fluid-solid separation unit configured to separate the first reactor effluent from a used mixed catalyst;

a second reactor containing a second portion of the cracking catalyst, where the second reactor is a fluidized bed reactor, and the second reactor is configured to contact at least a portion of the first reactor effluent with the second portion of the cracking catalyst to produce a second reactor effluent, a second fluid-solid separation unit disposed at an outlet end of the second reactor, the second fluid-solid separation unit configured to separate the second reactor effluent from the second portion of the cracking catalyst to produce a used second portion of the cracking catalyst;

a catalyst separator disposed downstream of the first fluid-solid separation unit and configured to separate the used mixed catalyst to produce a used decontamination catalyst and a used first portion of the cracking catalyst;

a decontamination catalyst regenerator disposed downstream of the catalyst separator, the decontamination catalyst regenerator configured to regenerate the used decontamination catalyst to produce regenerated decontamination catalyst; and a cracking catalyst regenerator disposed downstream of the second fluid-solid separation unit, the cracking catalyst regenerator configured to regenerate the used first portion of the cracking catalyst and the used second portion of the cracking catalyst to produce regenerated cracking catalyst;

wherein the decontamination catalyst comprises a plurality of metal oxides, each of the metal oxides are randomly distributed throughout the decontamination catalyst, and the plurality of metal oxides are selected from the group consisting of $Fe_2O_3$, $ZrO_2$, $CeO_2$, $Al_2O_3$, $TiO_2$, CaO, $Na_2O$, MgO, and combinations thereof.

13. The system of claim 12, further comprising:

a first regenerated cracking catalyst transfer line in fluid communication with the cracking catalyst regenerator and an inlet end of the first reactor, wherein the first regenerated cracking catalyst transfer line is configured to transport a first portion of the regenerated cracking catalyst from the cracking catalyst regenerator to the first reactor; and a second regenerated cracking catalyst transfer line in fluid communication with the cracking catalyst regenerator and an inlet end of the second reactor, where the second regenerated cracking catalyst transfer line is configured to transport a second portion of the regenerated catalyst from the cracking catalyst regenerator to the second reactor.

14. The system of claim 12, where the cracking catalyst regenerator is in fluid communication with the second fluid-solid separation unit and the catalyst separator to pass the used first portion of the cracking catalyst and the used second portion of the cracking catalyst to the cracking catalyst regenerator, and the decontamination catalyst regenerator is in fluid communication with the catalyst separator to pass the used decontamination catalyst from the catalyst separator to the decontamination catalyst regenerator.

15. The system of claim 12, further comprising an adsorption unit disposed downstream of the first reactor and upstream of the second reactor, where the adsorption unit is in fluid communication with the first fluid-solid separator to pass the first reactor effluent to the adsorption unit, where the adsorption unit comprises an adsorbent and is configured to contact the first reactor effluent with the adsorbent.

16. The system of claim 15, further comprising a first effluent separation system disposed downstream of the adsorption unit and the second reactor, where:

the first effluent separation system is configured to separate the treated first reactor effluent to produce a light effluent and a heavy stream; and the first effluent separation system is in fluid communication with the second reactor to pass the heavy stream to the second reactor.

17. The system of claim 12, further comprising a control system comprising one or more processors, one or more memory modules, and computer readable and executable instructions stored on the one or more memory modules.

18. The system of claim 17, further comprising:

a water wash unit disposed upstream of the first reactor, where the water wash unit is configured to contact the plastic derived oil stream with water to remove inorganic contaminants, polar contaminants, or both from the plastic derived oil to produce a washed plastic derived oil; and an upstream adsorption unit disposed between the water wash unit and the first reactor, where the upstream adsorption unit is configured to contact the washed plastic derived oil with an adsorbent to remove at least a portion of the halogen-containing compounds from the washed plastic derived oil to produce a treated plastic derived oil;

a sensor disposed in the plastic derived oil stream and configured to measure a concentration of the halogen-containing compounds in the plastic derived oil stream;

a first control valve disposed upstream of the first reactor and configured to control a flow of the plastic derived oil stream to the first reactor; and a second control valve disposed upstream of the water wash unit and configured to control a flow of the plastic derived oil stream to the water wash unit;

where the control system is communicatively coupled to the sensor, the first control valve, and the second control valve; and where the machine readable and executable instructions, when executed by the one or more processors, causes the system to automatically:

measure a concentration of the halogen-containing compounds in the plastic derived oil steam with the sensor;

compare the concentration of the halogen-containing compounds to a threshold concentration;

when the concentration of the halogen-containing compounds is less than the threshold concentration, pass the plastic derived oil stream directly to the first reactor; and when the concentration of the halogen-containing compounds is greater than or equal to the threshold concentration, pass the plastic derived oil to the water wash unit and then to the upstream adsorption unit.

19. The system of claim 17, further comprising:

a sensor disposed in the plastic derived oil stream and configured to measure a concentration of the halogen-containing compounds, a concentration of heavy compounds, or both in the plastic derived oil stream;

a decontamination catalyst valve disposed in a regenerated decontamination catalyst line that fluidly couple the decontamination catalyst regenerator to an inlet of the first reactor; and a cracking catalyst valve disposed in a second regenerated cracking catalyst transfer line that fluidly couples the cracking catalyst regenerator to the inlet of the first reactor;

where the control system is communicatively coupled to the sensor and to the decontamination catalyst valve, the cracking catalyst valve, or both; and where the machine readable and executable instructions, when executed by the one or more processors, causes the system to automatically:

measure a concentration of the halogen-containing compounds, a concentration of heavy compounds, or both in the plastic derived oil steam with the sensor;

adjust a position of the decontamination catalyst valve, the cracking catalyst valve, or both to change a catalyst weight ratio in the mixed catalyst based on the concentration of the halogen-containing compounds, the concentration of heavy compounds, or both in the plastic derived oil stream.

* * * * *